United States Patent
Nishikawa et al.

(10) Patent No.: US 8,468,851 B2
(45) Date of Patent: Jun. 25, 2013

(54) VACUUM DEGASSING APPARATUS AND VACUUM DEGASSING METHOD FOR MOLTEN GLASS

(75) Inventors: Toru Nishikawa, Tokyo (JP); Hironobu Yamamichi, Tokyo (JP); Tetsuya Koyama, Tokyo (JP); Yuji Endo, Tokyo (JP); Hajime Itoh, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/600,925

(22) Filed: Aug. 31, 2012

(65) Prior Publication Data

US 2012/0324957 A1    Dec. 27, 2012

Related U.S. Application Data

(60) Division of application No. 12/853,408, filed on Aug. 10, 2010, now Pat. No. 8,347,654, which is a continuation of application No. PCT/JP2009/052810, filed on Feb. 18, 2009.

(30) Foreign Application Priority Data

Feb. 27, 2008    (JP) ................................. 2008-046247

(51) Int. Cl.
    *C03B 5/225*    (2006.01)
(52) U.S. Cl.
    USPC ........ 65/134.2; 65/134.1; 65/134.9; 65/135.1
(58) Field of Classification Search
    USPC ........... 266/209, 210; 65/134.1, 134.9, 135.1, 65/346, 347
    See application file for complete search history.

(56) References Cited

U.S. PATENT DOCUMENTS

| 3,042,510 A | 7/1962 | Armbruster et al. |
| 3,367,396 A | 2/1968 | Stich et al. |
| 5,370,723 A * | 12/1994 | Trevelyan et al. .............. 65/346 |
| 5,849,058 A | 12/1998 | Takeshita et al. |
| RE36,082 E * | 2/1999 | Ishimura et al. ............... 65/32.5 |
| 6,405,564 B1 | 6/2002 | Takei et al. |
| 2005/0229637 A1* | 10/2005 | Hamashima et al. ......... 65/134.2 |
| 2008/0083250 A1* | 4/2008 | Nagno et al. .................... 65/355 |
| 2009/0165501 A1 | 7/2009 | Sasaki et al. |

FOREIGN PATENT DOCUMENTS

| EP | 0 775 671 A1 | 5/1997 |
| EP | 2 060 545 A1 | 5/2009 |
| JP | 05263123 | 10/1993 |
| JP | 2000-007344 | 1/2000 |

(Continued)

OTHER PUBLICATIONS

Search Report issued Feb. 3, 2011, in European Patent Application No. 097139975.2-211/2248774.

*Primary Examiner* — Christina Johnson
*Assistant Examiner* — Lisa Herring
(74) *Attorney, Agent, or Firm* — Oblon, Spivak, McClelland, Maier & Neustadt, L.L.P.

(57) ABSTRACT

A vacuum degassing apparatus for molten glass is comprised of an uprising pipe, a vacuum degassing vessel, a downfalling pipe, an upstream side pit that supplies molten glass to the uprising pipe, and a downstream side pit that receives molten glass from the downfalling pipe. The vacuum degassing apparatus for molten glass is further comprised of a separating mechanism that separates a part of molten glass moving from the downfalling pipe to the downstream side pit, and a returning pipe that returns separated molten glass to the upstream side pit.

21 Claims, 9 Drawing Sheets

FOREIGN PATENT DOCUMENTS

| | | |
|---|---|---|
| JP | 2006-240962 | 9/2006 |
| JP | 2006-306662 | 11/2006 |
| WO | 2004/060820 | 7/2004 |
| WO | WO 2006123479 A1 * | 11/2006 |
| WO | 2007/020754 | 2/2007 |
| WO | 2008/026606 A1 | 3/2008 |

* cited by examiner

VACUUM DEGASSING APPARATUS AND VACUUM DEGASSING METHOD FOR MOLTEN GLASS

CROSS REFERENCE TO RELATED APPLICATIONS

The present application is a division of and claims the benefits of priority to U.S. Ser. No. 12/853,408, filed Aug. 10, 2010, which is a continuation of PCT/JP09/052810, filed Feb. 18, 2009, and claims the benefit of priority to Japanese Patent Application No. 2008-046247, filed Feb. 27, 2008. The entire contents of all of the above applications are incorporated herein by reference.

TECHNICAL FIELD

The present invention relates to a vacuum degassing apparatus for molten glass and a vacuum degassing method for molten glass.

BACKGROUND ART

Heretofore, in order to improve the quality of formed glass products, a refining step is carried out to remove bubbles generated in molten glass produced by melting a raw material in a melting furnace, before shaping the molten glass in a forming apparatus.

In this refining step, there has been known a method of adding e.g. sodium sulfate ($Na_2SO_4$) as a refining agent into a raw material in advance, melting the raw material to produce molten glass, retaining and maintaining the molten glass at a predetermined temperature, and thereby making bubbles in the molten glass grow and move up by the refining agent, to remove these bubbles.

Further, there has been known a vacuum degassing method of introducing molten glass in a vacuum atmosphere, growing bubbles present in a flow of molten glass continuously flowing in the vacuum atmosphere, thereby making the bubbles move up and break to remove the bubbles, followed by exhausting the molten glass from the vacuum atmosphere.

In the vacuum degassing method, a molten glass flow is formed and the molten glass moves in a vacuum atmosphere, specifically, in a vacuum degassing vessel inside of which is maintained to a predetermined vacuum degree. When the molten glass moves in the vacuum degassing vessel, bubbles contained in the molten glass are grown remarkably relatively in a short time, so that the grown bubbles move up in the molten glass by their buoyance forces and destroyed at a surface of the molten glass, thereby to remove the bubbles from the molten glass surface efficiently.

In such a vacuum degassing apparatus, the material constituting a conduit for molten glass such as a vacuum degassing vessel, an uprising pipe or a downfalling pipe, that constitutes a flow path for molten glass, is required to be excellent in heat resistance and corrosion resistance against molten glass. As a material satisfying this requirement, platinum or a platinum alloy such as a platinum-rhodium alloy, or a refractory bricks such as electrocast bricks, are employed.

These materials are materials excellent in heat resistance and corrosion resistance against molten glass, but in each of the cases where the conduit for molten glass is made of refractory bricks, platinum or a platinum alloy, bubbles may be generated on an interface between a conduit wall face and molten glass. When such generation of bubbles on the interface between the conduit wall face and the molten glass occurs in a vacuum degassing vessel (particularly on the downstream side of the vacuum degassing vessel) or in a downfalling pipe, it is difficult to remove bubbles from the molten glass, which causes defects in product glasses.

As described above, in order to remove bubbles in molten glass efficiently and securely, a process of growing bubbles in a molten glass and making the bubbles move up and break on a surface of the molten glass, is necessary. In order to conduct such a process securely and efficiently, it is necessary to maintain the degree of vacuum in the vacuum degassing vessel within a proper range.

In the vacuum degassing method for molten glass described in Patent Document 1, in order to always maintain the degree of vacuum in a vacuum degassing vessel within a proper range, it is proposed to compensate the degree of vacuum in the vacuum degassing vessel in accordance with change of a barometric pressure. However, when the degree of vacuum in the vacuum degassing vessel is compensated, the level of molten glass in the vacuum degassing vessel changes to affect the effect of vacuum degassing. Accordingly, in the vacuum degassing method for molten glass described in Patent Document 1, when the degree of vacuum in the vacuum degassing vessel is compensated, it is proposed to move up and down the position of the vacuum degassing vessel to maintain the level of molten glass in the vacuum degassing vessel to be constant.

In the method described in Patent Document 1, while the level of molten glass in the vacuum degassing vessel is maintained to be constant, the degree of vacuum in the vacuum degassing vessel is always maintained within a proper range, whereby it is possible to maintain the effect of vacuum degassing always in an optimum condition.

However, it is not possible to move up and down a vacuum degassing vessel in every vacuum degassing apparatus. For example, in a case of employing a large-sized vacuum degassing vessel to increase the degassing capacity of molten glass, it is extremely difficult to move up and down such a vacuum degassing vessel in accordance with compensation of the degree of vacuum in the vacuum degassing vessel, and such a method is not practical.

Further, in a case of a vacuum degassing apparatus having a structure that an uprising pipe and a downfalling pipe are fixed to an upstream side pit and a downstream side pit, respectively, such as the vacuum degassing apparatus described in Patent Document 2, it is not possible to move a vacuum degassing vessel up and down.

In such cases of a vacuum degassing apparatus having a vacuum degassing vessel that cannot be moved up and down, when the degree of vacuum in the vacuum degassing vessel is compensated in accordance with change of barometric pressure, the level of molten glass in the vacuum degassing vessel changes to affect the effect of vacuum degassing. Particularly, when the level of molten glass in the vacuum degassing vessel rises, the distance from the bottom of the vacuum degassing vessel to the level of molten glass increases, which prevents bubbles present in the vicinity of the bottom of the vacuum degassing vessel from moving up, and decreases the effect of vacuum degassing. When a vacuum degassing vessel cannot be moved up and down, it is difficult to adjust the pressure at the bottom since it is determined by the depth of the bottom from the level of molten glass in the vacuum degassing vessel.

Patent Document 1: JP-A-2006-306662
Patent Document 2: JP-A-2000-7344

DISCLOSURE OF THE INVENTION

Problems to be Solved by the Invention

In order to solve the above problems of conventional techniques, it is an object of the present invention to provide a vacuum degassing apparatus for molten glass and a vacuum degassing method for molten glass, which can suppress generation of bubbles on an interface between molten glass and a wall face of a conduit for molten glass such as a vacuum degassing vessel, an uprising pipe or a downfalling pipe constituting the vacuum degassing apparatus, which can suppress an influence of lowering of vacuum degassing effect due to rise of the level of molten glass in the vacuum degassing vessel, and which can thereby exhibit the effect of vacuum degassing stably.

Means for Solving the Problems

In order to achieve the above object, the present invention provides a vacuum degassing apparatus for molten glass, comprising an uprising pipe, a vacuum degassing vessel, a downfalling pipe, an upstream side pit for supplying molten glass to the uprising pipe, and a downstream side pit for receiving molten glass from the downfalling pipe, wherein the vacuum degassing apparatus for molten glass further comprises a separating mechanism for separating a part of molten glass moving from the downfalling pipe to the downstream side pit, and a returning pipe for returning molten glass separated by the separating mechanism to the upstream side pit (hereinafter referred to as "vacuum degassing apparatus of the present invention").

A first embodiment of the vacuum degassing apparatus of the present invention is such that the downstream side pit has a side portion having an opening forming an end of the returning pipe, a conduit structure for molten glass comprising a hollow pipe made of platinum or a platinum alloy, a part of which functions as the separating mechanism, is connected to a downstream end of the downfalling pipe, the conduit structure has a double pipe structure comprising an inner pipe and an outer pipe, formed at least in the downstream end side portion of the conduit structure, the inner pipe has an upstream end and a downstream end that are open ends, the outer pipe has an upstream end, that is an open end, and a downstream end, that is a closed end, the inner pipe perforating through a part of the closed end, and an opening is provided in a downstream end side of the outer pipe at a position facing to the opening provided in the side portion of the downstream side pit.

A second embodiment of the vacuum degassing apparatus of the present invention is such that an opening forming an end of the returning pipe is provided in a side portion of the downstream side pit, the downfalling pipe has a conduit structure for molten glass comprising a hollow pipe made of platinum or a platinum alloy and having a part functioning as a separating mechanism, the conduit structure has a double pipe structure comprising an inner pipe and an outer pipe, formed at least in the downstream end side of the conduit structure, the inner pipe has an upstream end and a downstream end that are open ends, the outer pipe has an upstream end, that is an open end, and a downstream end, that is a closed end, the inner pipe perforating through a part of the closed end, and an opening is provided in a downstream end side of the outer pipe at a position facing to the opening provided in the side portion of the downstream side pit.

In the first and second embodiments of the vacuum degassing apparatus of the present invention, it is preferred that the inner pipe protrudes from the closed end of the outer pipe at the downstream end side of the conduit structure.

In the first and second embodiments of the vacuum degassing apparatus of the present invention, it is preferred that the distance $L_{in}$ (mm) from the upstream end of the inner pipe to the upstream end side of the opening provided in the downstream end side of the outer pipe, and the inner diameter $D_{in}$ (mm) of the inner pipe, satisfy the relation represented by the following formula:

$$L_{in} \geq D_{in}/2$$

In the first and second embodiments of the vacuum degassing apparatus of the present invention, it is preferred that the difference $D_{out-in}$ (mm) between the inner diameter of the outer pipe and the outer diameter of the inner pipe, and the inner diameter $D_{in}$ (mm) of the inner pipe, satisfy the relation represented by the following formula:

$$D_{out-in}/2 \geq 0.02 \times D_{in}$$

In the first and second embodiments of the vacuum degassing apparatus of the present invention, it is preferred that the distance $L_{in}$ (mm) from the upstream end of the inner pipe to the upstream side end of the opening provided in the downstream end side of the outer pipe, and the difference $D_{out-in}$ (mm) between the inner diameter of the outer pipe and the outer diameter of the inner pipe, satisfy the relation represented by the following formula:

$$L_{in} \geq (D_{out-in}/2) \times 3$$

In the first and second embodiments of the vacuum degassing apparatus of the present invention, it is preferred that the cross-sectional area difference $S_{out-in}$ (mm$^2$) obtained by subtracting the cross-sectional area of the flow path in the inner pipe from the cross-sectional area of the flow path in the outer pipe, and the cross-sectional area $S_{in}$ (mm$^2$) of the flow path in the inner pipe, satisfy the relation represented by the following formula:

$$S_{out-in} \leq S_{in}$$

In the first and second embodiments of the vacuum degassing apparatus of the present invention, it is preferred that the area S (mm$^2$) of the opening provided in the downstream end side of the outer pipe, and the inner diameter $D_{out}$ (mm) of the outer pipe, satisfy the relation represented by the following formula:

$$S \geq 9 \times D_{out}$$

In the first and second embodiments of the vacuum degassing apparatus of the present invention, it is preferred that the upstream side end of the opening provided in the downstream end side of the outer pipe is located at a position lower by 0 to 500 mm than the upstream side end of the opening provided in the side portion of the downstream side pit.

A third embodiment of the vacuum degassing apparatus of the present invention is such that the downfalling pipe and the downstream side pit are connected so as to communicate with each other, the downstream side pit has a double pipe structure comprising a pit main body being an outer pipe and an inner pipe located inside the pit main body and extending in the downstream direction, an opening forming an end of the returning pipe is provided in the pit main body, and the double pipe structure functions as the separating mechanism.

In the third embodiment of the vacuum degassing apparatus of the present invention, it is preferred that the inner diameter $D_1$ (mm) of the downfalling pipe and the outer diameter $D_2$ (mm) of the inner pipe satisfy the relation represented by the following formula:

$$D_1 > D_2$$

In the third embodiment of the vacuum degassing apparatus of the present invention, it is preferred that the difference $\Delta D$ (mm) between the inner diameter of the downfalling pipe and the outer diameter of the inner pipe, and the inner diameter $D_3$ (mm) of the inner pipe, satisfy the relation represented by the following formula:

$$\Delta D \geq 0.04 \times D_3$$

In the third embodiment of the vacuum degassing apparatus of the present invention, it is preferred that the cross-sectional area difference $\Delta S$ (mm$^2$) obtained by subtracting the cross-sectional area of the flow path in the inner pipe from the cross-sectional area of the flow path in the downfalling pipe, and the cross-sectional area $S_1$ (mm$^2$) of the flow path in the inner pipe, satisfy the relation represented by the following formula:

$$\Delta S \leq S_1$$

In the third embodiment of the vacuum degassing apparatus of the present invention, it is preferred that the downfalling pipe and the inner pipe partially overlap each other, and the length L (mm) of a portion where they overlap, and the outer diameter $D_2$ (mm) of the inner pipe, satisfy the relation represented by the following formula:

$$L \leq 5 \times D_2$$

In the third embodiment of the vacuum degassing apparatus of the present invention, it is preferred that the distance d (mm) between the downstream end of the downfalling pipe and the upstream end of the inner pipe, and the outer diameter $D_2$ (mm) of the inner pipe, satisfy the relation represented by the following formula:

$$0.5 \times D_2 \leq d \leq 5 \times D_2$$

A fourth embodiment of the vacuum degassing apparatus of the present invention is such that the opening of the returning pipe opening in the downstream side pit satisfies the following conditions (1) and (2), and the opening functions as the separating mechanism:

(1) the opening crosses a part of an imaginary area obtained by imaginarily extending the downfalling pipe in the downstream direction; and (2) the opening does not cross an imaginary line obtained by imaginarily extending the central axis of the downfalling pipe in the downstream direction.

In the fourth embodiment of the vacuum degassing apparatus of the present invention, it is preferred that the minimum distance $d_{min}$ (mm) between the returning pipe and the imaginary line, and the radius $D_{down}$ (mm) of the downfalling pipe, satisfy the relation represented by the following formula:

$$0 < d_{min} < D_{down}$$

In the fourth embodiment of the vacuum degassing apparatus of the present invention, it is preferred that an angle $\alpha$ (degree) between the opening and the imaginary line satisfy the relation represented by the following formula:

$$10 \leq \alpha \leq 80$$

In the fourth embodiment of the vacuum degassing apparatus of the present invention, it is preferred that the height of the bottom face of the downstream side pit is different from the height of the bottom face of the returning pipe in the vicinity of the opening.

In the fourth embodiment of the vacuum degassing apparatus of the present invention, it is preferred that the bottom face of the downstream side pit and the bottom face of the returning pipe, that have different heights from each other, are connected via a slope structure having an angle of from 5 to 60°.

In the fourth embodiment of the vacuum degassing apparatus of the present invention, it is preferred that the area of the opening approximately equals to the cross-sectional area of the returning pipe.

It is preferred that the vacuum degassing apparatus for molten glass of the present invention further comprises a pumping means for controlling the flow of molten glass in the returning pipe.

It is preferred that the vacuum degassing apparatus for molten glass of the present invention further comprises a means for heating molten glass passing through the returning pipe.

It is preferred that the vacuum degassing apparatus of the present invention further comprises a means for stirring molten glass passing through the returning pipe.

Further, the present invention provides a vacuum degassing method for molten glass, which is a method for vacuum-degassing molten glass by making the molten glass pass through a vacuum degassing vessel inside of which is maintained in a vacuum state, which comprises separating a part of molten glass flown out from the vacuum degassing vessel and returning the separated molten glass again to the vacuum degassing vessel (hereinafter referred to as "vacuum degassing method of the present invention").

In the vacuum degassing method of the present invention, it is preferred that the amount of the separated molten glass is at least 0.1% and at most 10% of the amount of molten glass passing through the vacuum degassing vessel.

In the vacuum degassing method of the present invention, it is preferred that the amount of the separated molten glass is at least 1% and at most 5% of the amount of molten glass passing through the vacuum degassing vessel.

In the vacuum degassing method of the present invention, it is preferred that the ratio of the amount of the separated molten glass to the amount of molten glass passing through the vacuum degassing vessel, is changed while molten glass is passing through the vacuum degassing vessel.

In the vacuum degassing method of the present invention, it is preferred that the separated molten glass is heated before it is returned to the vacuum degassing vessel.

In the vacuum degassing method of the present invention, it is preferred that the separated molten glass is stirred before it is returned to the vacuum degassing vessel.

Effects of the Invention

In the vacuum degassing method of the present invention, a part of molten glass flowing out from a vacuum degassing vessel, that is specifically a boundary laminar flow containing many bubbles caused by generation of bubbles on the interface between molten glass and a wall face of a conduit for molten glass or caused by lowering of vacuum degassing effect due to rise of level of molten glass in the vacuum degassing vessel, is split from a main flow of the molten glass and returned to the vacuum degassing vessel to be subjected to vacuum degassing treatment again. By this method, it is possible to suppress generation of bubbles on the interface between the molten glass and the wall face of the conduit for molten glass, or the influence of lowering of vacuum degassing effect due to rise of level of molten glass in the vacuum degassing vessel, to thereby stabilize the effect of vacuum degassing. By this method, it is possible to produce glass products of high quality having few defects.

Moreover, the molten glass separated from the main flow and returned to the vacuum degassing vessel constitutes a lower layer and molten glass newly supplied from a melting vessel constitutes an upper layer, whereby two layers are considered to be formed in the vacuum degassing vessel. Formation of such a two-layer flow reduces virtual depth of the molten glass newly supplied from the melting vessel in the vacuum degassing vessel. It is expected that this improves the effect of vacuum degassing.

Further, heretofore, the above molten glass containing bubbles has been discarded after the vacuum degassing. However, in the vacuum degassing method of the present invention, since the vacuum degassing is carried out again as described above, the amount of molten glass to be discarded reduces, and the yield increases.

The vacuum degassing apparatus of the present invention has a separating mechanism for separating a part of molten glass moving from the downfalling pipe to the downstream side pit, and a returning pipe for returning the molten glass separated by the separating mechanism to the upstream side pit, so as to efficiently separate a boundary laminar flow containing many bubbles from molten glass flown out from the vacuum degassing vessel. Accordingly, the vacuum degassing apparatus is suitable for carrying out the vacuum degassing method of the present invention.

EXPLANATION OF NUMERALS

Figure 1:
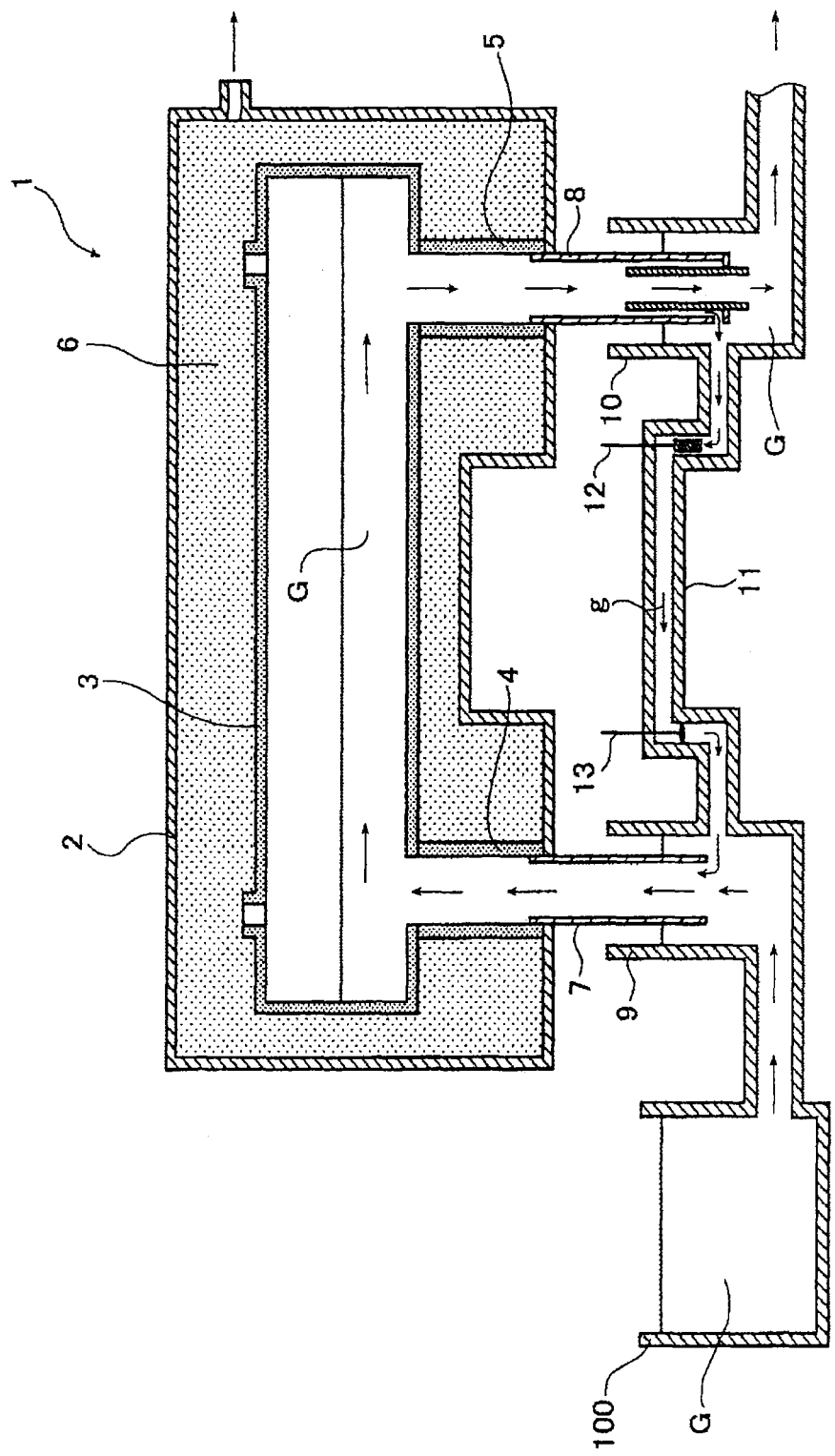
FIG. 1 is a cross-sectional view of a first embodiment of the vacuum degassing apparatus of the present invention.

1, 1', 1": Vacuum degassing apparatus
2: Vacuum housing
3: Vacuum degassing vessel
4, 4': Uprising pipe
5, 5': Downfalling pipe
6: Thermal insulator
7: Extension pipe (uprising pipe side)
8, 8', 14, 14': Extension pipe (downfalling pipe side)
81, 81', 81", 81''': Inner pipe
82, 82', 82", 82''': Outer pipe
83, 83', 83", 83''': Opening
9, 19: Upstream side pit
10, 15, 15', 20: Downstream side pit
11: Returning pipe
12: Pumping means
13: Stirring means
18: Diameter-expanding portion
22: Opening
23: Imaginary region
24: Imaginary line
100: Melting vessel

BEST MODE FOR CARRYING OUT THE INVENTION

Now, the present invention will be described with reference to drawings. FIG. 1 is a cross-sectional view of a first embodiment of the vacuum degassing apparatus of the present invention. The vacuum degassing apparatus shown in FIG. 1 is employed for a process of vacuum-degassing a molten glass G in a melting vessel 100 and continuously supplying the molten glass G to a subsequent treatment vessel (not shown).

The vacuum degassing apparatus 1 has a vacuum housing made of a metal such as a stainless steel, inside of which is maintained in a vacuum state at a time of operation. Inside the vacuum housing 2, a vacuum degassing vessel 3 is contained and disposed so that its longitudinal axis extends in a horizontal direction. To an under surface of an end of the vacuum degassing vessel 3, an uprising pipe 4 extending in the vertical direction is attached, and to an under surface of the other end, a downfalling pipe 5 is attached.

In the vacuum housing 2, a thermal insulator 6 is provided around the vacuum degassing vessel 3, the uprising pipe 4 and the downfalling pipe 5.

In the vacuum degassing apparatus 1, each of the vacuum degassing vessel 3, the uprising pipe 4 and the downfalling pipe 5 is a hollow pipe made of refractory bricks such as electrocast bricks, platinum or a platinum alloy.

When the vacuum degassing vessel 3 is a hollow pipe made of refractory bricks, the vacuum degassing vessel 3 is preferably a hollow pipe made of refractory bricks, that has a rectangular external cross section, and the inner shape forming a flow path of molten glass preferably has a rectangular cross section.

When the uprising pipe 4 and the downfalling pipe 5 are each a hollow pipe made of refractory bricks, the uprising pipe 4 and the downfalling pipe 5 are preferably each a hollow pipe made of refractory bricks, that has a circular cross section or a polygonal cross section including rectangle as an external shape, and the internal shape forming a flow path of molten glass preferably has a circular cross section.

On the other hand, when the vacuum degassing vessel 3 is a hollow pipe made of platinum or a platinum alloy, the internal cross-sectional shape forming a flow path of molten glass in the vacuum degassing vessel 3 is preferably a circular or elliptical shape.

When the uprising pipe and the downfalling pipe are each a hollow pipe made of platinum or a platinum alloy, the internal cross-sectional shape forming a flow path of molten glass in each of the uprising pipe 4 and the downfalling pipe 5 is preferably a circular or elliptical shape.

Dimensions of constituents of the vacuum degassing apparatus can be appropriately selected depending on the vacuum degassing apparatus to be used. In a case of a vacuum degassing vessel 3 shown in FIG. 1, the dimensions are, for example, as follows.

The length in the horizontal direction is from 1 to 30 m, preferably from 1 to 25 m, more preferably from 1 to 20 m. The width of the internal cross-sectional shape is from 0.2 to 10 m, preferably from 0.2 to 7 m, more preferably from 0.2 to 5 m.

Further, a specific example of the dimensions of the uprising pipe 4 and the downfalling pipe 5 are as follows.

The length is from 0.2 to 6 m, preferably from 0.4 to 4 m.

The width of the internal cross-sectional shape is from 0.05 to 0.8 m, preferably from 0.1 to 6 m.

To the lower ends (downstream ends) of the uprising pipe 4 and the downfalling pipe 5, respective extension pipes 7 and 8 are attached. The extension pipes 7 and 8 are each a hollow cylindrical pipe made of platinum or a platinum alloy.

The uprising pipe 4 communicates with the vacuum degassing vessel 3, and introduces molten glass G from a melting vessel 100 to the vacuum degassing vessel 3. For this reason, a lower end (downstream end) of the extension pipe 7 attached to the uprising pipe 4 is fit into an opening end of the upstream side pit 9, and is immersed in the molten glass G in the upstream side pit 9.

The downfalling pipe 5 communicates with the vacuum degassing vessel 3, and discharges vacuum-degassed molten glass G to a next treatment vessel (not shown). For this reason, a lower end (downstream end) of the extension pipe 8 attached to the downfalling pipe 5 is fit into an open end of a downstream side pit 10, and immersed in molten glass G in the downstream side pit 10.

The upstream side pit 9 and the downstream side pit 10 are made of refractory bricks, platinum or a platinum alloy. When the upstream side pit 9 and the downstream side pit 10 are made of refractory bricks, their cross-sectional shapes are preferably each a polygonal shape such as a rectangular shape, or a circular or elliptical shape for the reason of easiness of fabrication and prevention of corrosion of refractory bricks, etc. On the other hand, when the upstream side pit 9 and the downstream side pit 10 are made of platinum or a platinum alloy, their cross-sectional shapes are preferably each a circular or elliptical shape for the reason of easiness of fabrication and hardness of deformation, etc.

As described in detail later, the extension pipe 8 forming a conduit structure for molten glass, has a lower end (downstream end) side having a double pipe structure which functions as a separating mechanism for separating a part of molten glass G moving from the downfalling pipe 5 to the downstream side pit 10. More specifically, a part of the molten glass containing many bubbles caused by generation of bubbles on the interface between molten glass and a wall face of a conduit for molten glass or caused by lowering of vacuum degassing effect due to rise of the level of molten glass in the vacuum degassing vessel, is split from the main flow of the molten glass G moving from the downfalling pipe 5 to the downstream side pit 10. A returning pipe for returning the molten glass separated by the separating mechanism to the upstream side pit 9, connects the downstream side pit 10 and the upstream side pit 9.

The returning pipe 11 is provided with a pumping means 12 for controlling the molten glass flow in the returning pipe 11 and a stirring means 13 for stirring molten glass passing through the returning pipe 11. However, the pumping means 12 and the stirring means 13 are not essential constituents in the first embodiment of the vacuum degassing apparatus of the present invention, and the vacuum degassing apparatus 1 is not necessarily have these means so long as the apparatus can exhibit intended functions without these means.

Figure 2:
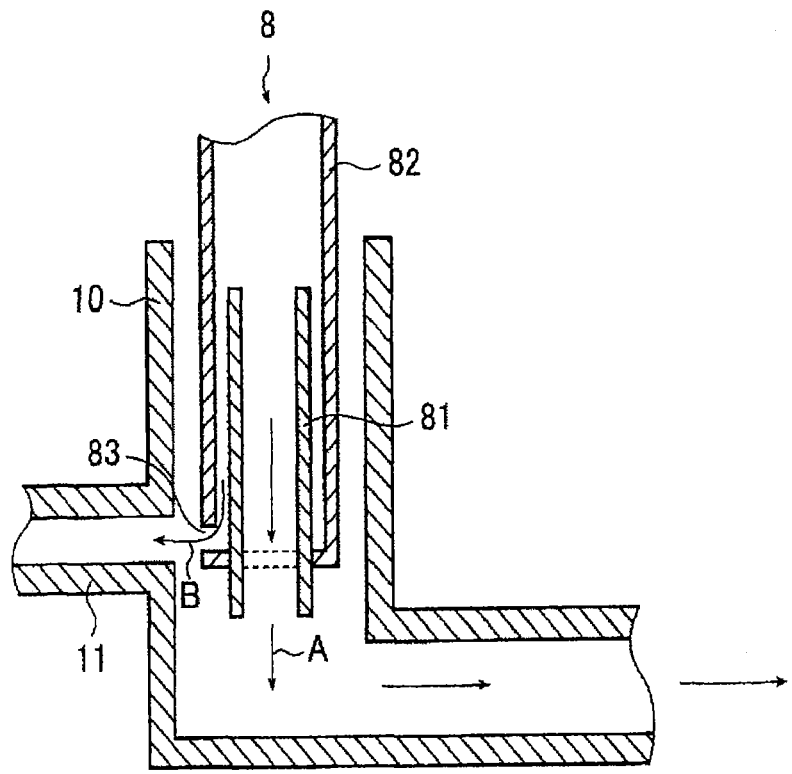
FIG. 2 is a partial enlarged view showing a lower end (downstream end) side of an extension pipe 8 and its vicinity of the vacuum degassing apparatus 1 shown in FIG. 1.

FIG. 2 is a partial enlarged view showing a lower end (downstream end) side of the extension pipe 8 and its vicinity of the vacuum degassing apparatus shown in FIG. 1.

The extension pipe 8 shown in FIG. 2 has a lower end (downstream end) side having a double pipe structure comprising an inner pipe 81 and an outer pipe 82. The inner pipe 81 and an outer pipe 82 are each a hollow cylindrical pipe made of platinum or a platinum alloy. Here, the platinum alloy may, for example, be a platinum-gold alloy or a platinum-rhodium alloy. "Platinum or a platinum alloy" includes a reinforced platinum formed by dispersing a metal oxide in platinum or in a platinum alloy. The metal oxide to be dispersed may, for example, be a metal oxide of Group 3, 4 or 13 in the long periodic table such as $Al_2O_3$, $ZrO_2$ or $Y_2O_3$.

In the extension pipe 8 shown in FIG. 2, the inner pipe has an upper end (upstream end) and a lower end (downstream end) that are open ends.

The outer pipe 82 has an upper end (upstream end) that is an open end, and a lower end (downstream end) that is a closed end. The inner pipe 81 perforates through a part of the lower end (downstream end) of the outer pipe 82 that is a closed end, and the lower end (downstream end) of the inner pipe 81 protrudes from the lower end (downstream end) (closed end) of the outer pipe 82. Here, in the extension pipe 8 shown in FIG. 2, the lower end (downstream end) of the inner pipe 81 protrudes from the lower end (downstream end) (closed end) of the outer pipe 82, but the lower end (downstream end) of the inner pipe is not necessarily protrude from the lower end (downstream end) (closed end) of the outer pipe. In this case, the height of the lower end (downstream end) of the inner pipe is equal to the height of the lower end (downstream end) of the outer pipe. The phrase "the inner pipe 81 perforates through a part of the lower end (downstream end) of the outer pipe 82 that is a closed end", means that a part of the lower end (downstream end) of the outer pipe 82 that is a closed end, is provided with an opening into which the lower end (downstream end) of the outer pipe 81 that is an open end is fit.

The lower end (downstream end) (closed end) side of the outer pipe 82 is provided with an opening 83. More specifically, a side wall on the lower end (downstream end) (closed end) side of the outer pipe 82 is provided with an opening 83 having a laterally elongated rectangular shape whose side in the longitudinal direction of the outer pipe 82 is longer than whose side in the circumferential direction of the outer pipe 82. In FIG. 2, the opening 83 is located at approximately the same height as that of the opening of the returning pipe 11 provided in the side portion (side wall) of the downstream side pit 10. Here, the opening 83 is preferably located at approximately the same height as that of the opening of the return pipe 11 provided in the side portion (side wall) of the downstream side pit, or the upper end (upstream side end) of the opening 83 is preferably located at a position lower than the upper end (upstream side end) of the opening of the return pipe 11.

When the lower end (downstream end) side of the extension pipe 8 has a double pipe structure, the double pipe structure functions as a separating mechanism for separating from a main flow of a molten glass G moving from the downfalling pipe 5 to the downstream side pit 10, a portion containing many bubbles due to generation of bubbles on the interface between molten glass and a wall face of the conduit for molten glass or caused by lowering of vacuum degassing effect due to rise of molten glass level in the vacuum degassing vessel. The reason that the extension pipe 8 functions as a separating mechanism, will be described as follows.

As described above, one reason why the bubbles in the molten glass increases in spite of the vacuum degassing, is generation of bubbles on the interface between molten glass and the wall face of the conduit for molten glass. Bubbles generated on the interface between molten glass and the wall face of molten glass, are not uniformly dispersed in the molten glass, but they flow in a boundary laminar flow having a certain thickness along the wall face of the conduit, for example, in a boundary laminar flow having a thickness of from about 10 to 50 mm.

Further, another reason why the bubbles in the molten glass increases, is because when the level of molten glass in the vacuum degassing vessel rises, the vacuum degassing effect decreases to prevent moving up of bubbles present in the vicinity of the bottom face of the vacuum degassing vessel. Such bubbles present in the vicinity of the bottom face of the vacuum degassing vessel 3 flow out from the vacuum degassing vessel 3 to reach the downfalling pipe 5 (further to the extension pipe 8), and they flow in a boundary laminar flow having a thickness of, for example, about 3 to 5 mm formed along a wall face of the downfalling pipe 5 (further of the extension pipe 8), more specifically, along a wall face on a side of the pipes close to the upstream side in the horizontal flow direction of the molten glass in the vacuum degassing vessel (hereinafter referred to as "upstream side in horizontal direction").

Hereinafter, in this specification, a "boundary laminar flow" includes a boundary laminar flow caused by generation of bubbles on the interface between molten glass and a wall face of the conduit for molten glass, and a boundary laminar flow caused by decrease of degassing effect due to rise of the level of molten glass in the vacuum degassing vessel.

When a molten glass flow containing such a boundary laminar flow reaches the double pipe structure of the extension pipe shown in FIG. 2, the boundary laminar flow containing many bubbles moves into a gap portion (hereinafter referred to also as "gap portion of double pipe structure") between the outer wall of the inner pipe 81 and the inner wall of the outer pipe 82. Meanwhile, molten glass of a main flow other than the boundary laminar flow (hereinafter referred to as "main flow") moves into a gap inside the inner pipe 81 (hereinafter referred to as "inside inner pipe 81"). Accordingly, the boundary laminar flow is physically split from the main flow. Here, the main flow means a molten glass flow wherein bubbles are sufficiently removed by a vacuum degassing, which can be finally used as a product.

The main flow moving inside the inner pipe 81 moves in the direction of an arrow A in the Figure. Namely, the main flow passes through the lower end (downstream end) (open end) of the inner pipe 81, and moves in the downstream direction in the downstream side pit 10. Meanwhile, the boundary laminar flow moving in the gap portion of the double pipe structure moves in the direction of an arrow B in the Figure. Namely, the boundary laminar flow flows out through the opening 83 provided on the side wall of the outer pipe 82 into the downstream side pit 10, and moves through the opening provided in the side portion (side wall) of the downstream side pit 10 into the returning pipe 11.

As a result, only the main flow from which bubbles are sufficiently removed by the vacuum degassing is supplied to a forming apparatus.

On the other hand, the boundary laminar flow containing many bubbles moves in the returning pipe 11 and is sent to the upstream side pit 9. The boundary laminar flow that has reached the upstream side pit 9, moves up in the uprising pipe 4 (more specifically, the extension pipe 7 and the uprising pipe 4) together with molten glass newly supplied from a melting vessel 100, and is sent to the vacuum degassing vessel 3.

Thus, in the vacuum degassing apparatus of the present invention, since the boundary laminar flow containing many bubbles is sent to the vacuum degassing vessel 3 and subjected to vacuum degassing again, it is possible to suppress the influence of generation of bubbles on the interface between molten glass and a wall face of the conduit for molten glass or lowering of vacuum degassing effect due to rise of the level of molten glass in the vacuum degassing vessel.

Moreover, the boundary laminar flow sent to the upstream side pit 9 rises along the returning pipe side of the uprising pipe 4 as it is along with molten glass supplied from the melting vessel 100. Accordingly, in the vacuum degassing vessel 3, it is considered that the molten glass separated from the main flow and returned to the vacuum degassing vessel 3 constitutes a lower flow while the molten glass newly supplied from the melting vessel 100 constitutes an upper flow, to form a two-layer flow. Since such a two-layer flow is formed, a virtual depth of the molten glass newly supplied from the melting vessel 100 in the vacuum degassing vessel 3, decreases. Accordingly, improvement of vacuum degassing effect is expected.

Here, the above effect obtainable by separating the boundary laminar flow containing many bubbles by the separating mechanism and returning it through the returning pipe to the vacuum degassing vessel, is also exhibited in the same manner in the vacuum degassing apparatuses of second to fourth embodiments.

In the first embodiment of the vacuum degassing apparatus of the present invention, the following points should be noted to properly separate the boundary laminar flow from the main flow. Please refer to FIG. 3 for the following points. Here, FIG. 3 is the same as FIG. 2 except that symbols showing dimensions of portions are added in FIG. 3.

Figure 3:
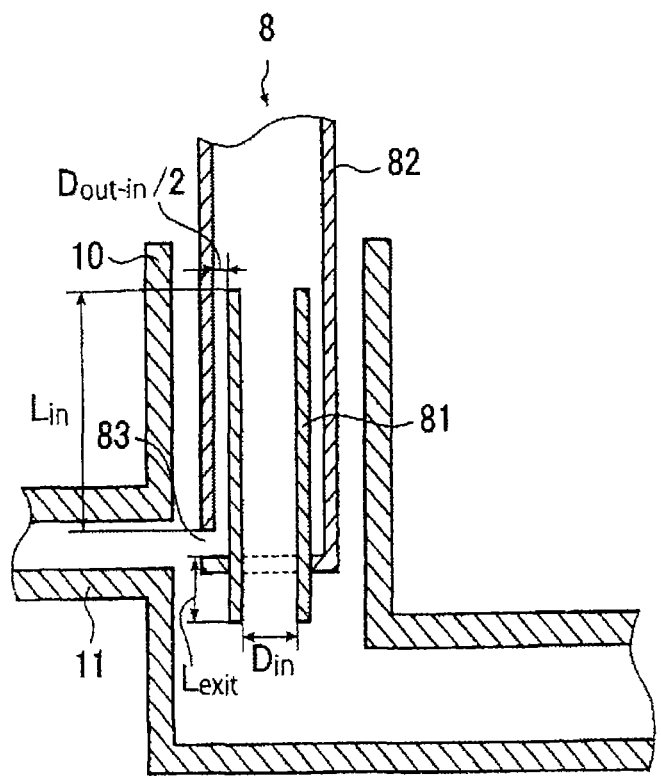
FIG. 3 is a view similar to FIG. 2, which further shows dimensions of specific portions of the extension pipe 8.

In the extension pipe 8 shown in FIG. 3, in order to prevent the boundary laminar flow (represented by an arrow B in FIG. 2) from the opening 83 from merging again with the main flow of molten glass (represented by an arrow A in FIG. 2) from the inner pipe 81, the inner pipe 83 shown in FIG. 3 preferably protrude from the lower end (downstream end) (closed end) of the outer pipe 82.

Although the situation depends on the position and shape of the opening 83 provided in the side wall of the outer pipe 82, if the distance between the opening 83 being an outlet of the boundary laminar flow and the lower end (downstream end) of the inner pipe 81 being an outlet of the main flow, is small, the boundary laminar flow and the main flow, that are separated by the double pipe mechanism, may merge again. When the inner pipe 81 protrudes from the lower end (downstream end) (closed end) of the outer pipe 82, the lower end (downstream end) of the inner pipe 81 is sufficiently distant from the opening 83. Accordingly, there is no risk that the boundary laminar flow merges with the main flow again, and it is possible to securely separate these flows.

In order to securely separate the boundary laminar flow from the main flow, the distance $L_{exit}$ from the lower end (downstream side end) of the opening 83 to the lower end (downstream end) of the inner pipe 81, is preferably from 10 to 200 mm.

In order to physically separate the boundary laminar flow from the main flow, the distance $L_{in}$ (mm) from the upper end (upstream end) of the inner pipe 81 to the upper end (upstream side end) of the opening 83, and the inner diameter $D_{in}$ (mm) of the inner pipe 81, preferably satisfy the relation represented by the following formula (1).

$$L_{in} \geq D_{in}/2 \quad (1)$$

When $L_{in}$ and $D_{in}$ satisfy the relation represented by the above formula (1), the length of the double pipe structure from the opening 83, more specifically, the length of the gap portion in the double pipe structure from the opening 83, is sufficient for physically separating the boundary laminar flow from the main flow.

$D_{in}$ changes depending on the size of the vacuum degassing apparatus, in particular, on the flow rate (t/day) of molten glass passing through the apparatus, but it is usually from 50 to 900 mm, more preferably from 100 to 700 mm. $L_{in}$ is preferably at least 50 mm, more preferably at least 100 mm, particularly preferably at least 200 mm and at most 1,500 mm. Here, the extension pipe 8 may have a double pipe structure in the entire length so long as there is no problem in the cost. On the other hand, if $L_{in}$ is 50 mm or less, the distance to the opening 83 becomes insufficient and separation of the boundary laminar flow from the main flow may become insufficient.

In the first embodiment of the vacuum degassing apparatus of the present invention, $L_{in}$ (mm) and $D_{in}$ (mm) preferably satisfy the relation represented by the following formula (2), more preferably satisfy the relation represented by the following formula (3).

$$L_{in} \geq 1.0 \times D_{in} \quad (2)$$

$$1.0 \times D_{in} \leq L_{in} \leq 4 \times D_{in} \quad (3)$$

In the vacuum degassing apparatus 1 shown in FIG. 1, the length of the entire extension pipe 8 including a portion other than the double pipe structure, is usually from 100 to 3,000 mm, more preferably from 200 to 1,500 mm. In the vacuum degassing apparatus 1 having a structure shown in FIG. 1, in order to adjust the level of molten glass G in the vacuum degassing vessel 3, it is necessary to move up and down the vacuum degassing vessel 3 by maximum about 600 mm. At this time, it is necessary that the leading edge of the extension pipe 8 is always immersed in molten glass G in the downstream side pit 10. When the length of the entire extension pipe 8 is within the above range, even if the vacuum degassing vessel 3 is moved up and down in the maximum range, the leading edge of the extension pipe 8 is always immersed in molten glass G in the downstream side pit 10.

In order to physically separate the boundary laminar flow from the main flow, the difference $D_{out-in}$ (mm) between the inner diameter of the outer pipe 82 and the outer diameter of the inner pipe 81 preferably satisfies the relation represented by the following formula (4) with the inner diameter $D_{in}$ (mm) of the inner pipe 81. Here, $D_{out-in}/2$ corresponds to the width of the gap portion of the double pipe structure.

$$D_{out-in}/2 \geq 0.02 \times D_{in} \quad (4)$$

When $D_{out-in}$ and $D_{in}$ satisfy the relation represented by the above formula (4), the width of the gap portion of the double pipe structure is sufficient for physically separating the boundary laminar flow from the main flow.

The thickness of the boundary laminar flow slightly changes depending on the temperature or the viscosity of molten glass or the material constituting the flow path, etc., and it is usually about from 3 to 5 mm. In order to prevent such a boundary laminar flow from flowing into the main flow, the above relation is required.

$D_{out-in}/2$ is, specifically, preferably at least 5 mm, more preferably at least 10 mm, particularly preferably at most 100 mm. If $D_{out-in}/2$ exceeds 100 mm, the width of the gap portion of the double pipe structure becomes too large in relation to the thickness of the boundary laminar flow, and accordingly, the amount of the molten glass separated from the main flow and moving into the gap portion of the double pipe structure increases, to decrease the yield of production of the glass, such being not preferred.

In the extension pipe 8 shown in FIG. 2, it is preferred that only the boundary laminar flow is separated to move into the gap portion of the double pipe structure, and in order to achieve this, it is ideal to make the width of the gap portion of the double pipe structure to be substantially the same as the thickness of the boundary laminar flow. However, the thickness of the boundary laminar flow at a time of conducting a vacuum degassing is not always constant and it may vary. Accordingly, in order to securely separate the boundary laminar flow to move it to the gap portion of the double pipe structure, the width of the gap portion of the double pipe structure is preferably larger than the thickness of the boundary laminar flow to a certain extent. In this case, a part of the main flow is also separated to move into the gap portion of the double pipe structure.

Accordingly, if the width of the gap portion of the double pipe structure is too large as compared with the thickness of the boundary laminar flow, the amount of main flow separated to move into the gap portion of the double pipe structure increases to lower the yield of production of glass, such being not preferred.

In the first embodiment of the vacuum degassing apparatus of the present invention, $D_{out-in}$ (mm) and $D_{in}$ (mm) preferably satisfy the relation represented by the following formula (5), more preferably satisfy the relation represented by the following formula (6).

$$D_{out-in}/2 \geq 0.04 \times D_{in} \quad (5)$$

$$0.04 \times D_{in} \leq D_{out-in}/2 \leq 0.25 \times D_{in} \quad (6)$$

Here, $D_{in}$ is usually from 50 to 900 mm as described above, more preferably from 100 to 700 mm. The wall thicknesses of the inner pipe 81 and the outer pipe 82 that are to be employed for a conduit structure of molten glass and made of platinum or a platinum alloy, are each preferably from 0.4 to 6 mm, more preferably from 0.8 to 4 mm.

For the above reasons, the outer diameter of the inner pipe 81 is preferably from 55 to 905 mm, more preferably from 105 to 705 mm. The outer diameter of the outer pipe 82 is preferably from 70 to 1,200 mm, more preferably from 100 to 1,000 mm.

Further, in order to physically separate the boundary laminar flow from the main flow, the distance $L_{in}$ (mm) from the upper end (upstream end) of the inner pipe 81 to the upper end (upstream side end) of the opening 83, and the difference $D_{out-in}$ (mm) between the inner diameter of the outer pipe 82 and the outer diameter of the inner pipe 81, preferably satisfy the relation represented by the following formula (7).

$$L_{in} \geqq (D_{out-in}/2) \times 3 \tag{7}$$

When $L_{in}$ and $D_{out-in}$ satisfy the above relation, the length $L_{in}$ of the gap portion of the double pipe structure from the opening 83 in relation to the width ($D_{out-in}/2$) of the gap portion of the double pipe structure, is sufficient for physically separating the boundary laminar flow from the main flow.

Further, $D_{out-in} \times 20 \geqq L_{in}$ is preferably satisfied.

Further, in order to physically separate the boundary laminar flow from the main flow, the cross-sectional area difference $S_{out-in}$ (mm$^2$) obtained by subtracting the cross-sectional area of the flow path in the inner pipe 81 from the cross-sectional area of the flow path in the outer pipe 82, and the cross-sectional area $S_{in}$ (mm$^2$) of the inner pipe 81, preferably satisfy the relation represented by the following formula (8).

$$S_{out-in} \leqq S_{in} \tag{8}$$

Here, the cross-sectional areas of the flow paths in the outer pipe 82 and the inner pipe 81, mean cross-sectional areas perpendicular to the longitudinal directions of the flow paths in the outer pipe 82 and the inner pipe 81. When $S_{out-in}$ and $S_{in}$ satisfy the relation represented by the formula (8), the width of the gap portion of the double pipe structure does not become too large in relation to the thickness of the boundary laminar flow, and accordingly, the amount of molten glass in the main flow separated to move into the gap portion of the double pipe structure does not increase. Accordingly, the yield of production of glass does not decrease.

In the first embodiment of the vacuum degassing apparatus of the present invention, $S_{out-in}$ (mm$^2$) and $S_{in}$ (mm$^2$) preferably satisfy the relation represented by the following formula (9), more preferably satisfy the relation represented by the following formula (10).

$$S_{out-in} \leqq 0.90 \times S_{in} \tag{9}$$

$$S_{out-in} \leqq 0.80 \times S_{in} \tag{10}$$

Further, $0.50 \times S_{in} \leqq S_{out-in}$ is preferably satisfied.

Further, in order to physically separate the boundary laminar flow from the main flow, the area $S_{83}$ (mm$^2$) of the opening 83 and the inner diameter $D_{out}$ (mm) of the outer pipe 82 preferably satisfy the relation represented by the following formula (11).

$$S_{83} \geqq 9 \times D_{out} \tag{11}$$

Here, the area $S_{83}$ of the opening 83 is a projected area of the opening 83 on a plain. When $S_{83}$ and $D_{out}$ satisfy the relation represented by the above formula (11), the opening 83 is large enough to flow out molten glass passing through the gap portion between the outer pipe 82 and the inner pipe 81, and accordingly, the flow resistance of the boundary laminar flow does not increase significantly when it passes through the opening 83. If the opening 83 is extremely small, the flow resistance of the boundary laminar flow significantly increases when it passes through the opening 83. As a result, between the boundary laminar flow moving through the gap portion of the double pipe structure and the main flow moving inside the inner pipe 81, a significant difference of fluidity occurs to decrease the effect of separating the boundary laminar flow from the main flow. Here, the above formula (11) is a formula established from the viewpoint that flow of molten glass of at least 3 mm needs to be flown out through the opening when the thickness of the boundary laminar flow is 3 mm.

In the first embodiment of the vacuum degassing apparatus of the present invention, $S_{83}$ (mm$^2$) and $D_{out}$ (mm) preferably satisfy the relation represented by the following formula (12), more preferably satisfy the relation represented by the following formula (13).

$$S_{83} \geqq 12 \times D_{out} \tag{12}$$

$$20 \times D_{out} S_{83} \leqq 90 \times D_{out} \tag{13}$$

When $S_{83}$ is larger than $90 \times D_{out}$, the size of the opening 83 becomes too large in relation to the inner diameter of the outer pipe 82, and accordingly, the boundary laminar flow separated by the double pipe structure may merge with the main flow again.

Here, the opening 83 is preferably provided in the vicinity of the closed end of the outer pipe 82. Here, the vicinity of the closed end includes not only a portion of the closed end of the outer pipe 82, but also a side wall portion of the outer pipe 82 close to the closed end as shown in FIG. 2. "Portion close to closed end" here means a portion of the outer pipe 82 within 200 mm from the closed end.

By providing the opening 83 in the vicinity of the closed end, it is possible to increase the length of the gap portion in the double pipe structure for physically separating the boundary laminar flow from the main flow.

Further, the number of the opening 83 is not necessarily one but it may be plural. When the number of the openings is plural, it is sufficient that at least one opening is located at a position within 200 mm from the closed end of the outer pipe 82.

Further, when the opening 83 has a rectangular shape, it is preferably not a rectangular shape elongated in the longitudinal direction of the outer pipe 82 (that is a vertically elongated rectangular shape) but a rectangular shape elongated in the circumferential direction of the outer pipe 82 (that is a laterally elongated rectangular shape) for the reason that the flow resistance is small when the boundary laminar flow passes through the opening 83.

The shape of the opening 83 is not limited to a rectangular shape, but it may be a different shape. For example, it may be a square, circular or elliptical shape. Further, it may be a polygonal shape such as a triangular, pentangular, hexagonal or octagonal shape.

The length of the opening 83 in the circumferential direction of the outer pipe 82 (that is the width of the opening 83) is preferably smaller than the width of the opening of the returning pipe 11 provided in the side portion (side wall) of the downstream side pit 10. If the width of the opening 83 is larger than the width of the opening of the returning pipe 11, the boundary laminar flow separated by the double pipe structure may merge with the main flow again.

Here, the width of the opening 83 is a width of a shape produced by projecting the opening 83 on a plane.

Likewise, when the opening of the returning pipe 11 has a curved plane shape, the width of the opening of the returning pipe 11 is a width of a shape obtained by projecting the opening on a plane.

In FIG. 2, the opening 83 provided in the outer pipe 82 is located at a position close to the opening of the returning pipe 11 provided in a side portion (side wall) of the downstream side pit 10, more specifically, located at the same height of the opening of the returning pipe 11. Here, the upper end (upstream side end) of the opening 83 is preferably located at a position lower than the upper end (upstream side end) of the opening of the returning pipe 11 (specifically, the upper end (upstream side end) of the opening 83 is preferably located at a position from 0 to 500 mm lower than the upper end (upstream side end) of the opening of the returning pipe 11). In order to prevent the boundary laminar flow and the main flow separated by the double pipe structure from merging again, the upper end (upstream side end) of the opening 83 is preferably located at a position lower than the upper end (upstream side end) of the opening of the returning pipe 11.

As described above, in the vacuum degassing apparatus 1 having a structure shown in FIG. 1, in order to adjust the level of the molten glass in the vacuum degassing vessel 3, it is necessary to move up and down the vacuum degassing vessel 3 by maximum about 600 mm. Accordingly, the positional relationship between the opening 83 and the opening of the returning pipe 11 provided in a side portion (side wall) of the downstream side pit 10, changes to a certain extent from the positional relationship shown in FIG. 2. However, it is preferred that, even when the vacuum degassing vessel 3 is moved up and down, the opening 83 does not leave too far from the opening of the returning pipe 11 for the purpose of preventing the boundary laminar flow separated by the double pipe structure from merging with the main flow again. The distance between the upper end of the opening 83 and the upper end (upstream side end) of the opening of the returning pipe 11, in a state that they are at a maximum distance, is preferably at most 400 mm, more preferably at most 200 mm.

Further, in order to prevent the boundary laminar flow flown out from the opening 83 from merging with the main flow again, the area of the opening of the returning pipe 11 provided in a side portion (side wall) of the downstream side pit 10 needs to be large to a certain extent. Specifically, provided that the area of the opening of the returning pipe 11 is $S_{11}$ (mm$^2$), it preferably satisfies the relation represented by the following formula (14) with the area $S_{83}$ (mm$^2$) of the opening 83.

$$S_{11} \geq S_{83} \qquad (14)$$

In the first embodiment of the vacuum degassing apparatus of the present invention, the inner pipe 81 and the outer pipe 82 constituting the double pipe structure, are hollow pipes made of platinum or a platinum alloy, and their shapes are not limited so long as they satisfy the following conditions (1) to (3).

(1) The inner pipe 81 has an upper end (upstream end) and a lower end (downstream end) that are open ends.

(2) The outer pipe 82 has an upper end (upstream end) that is an open end, and a lower end (downstream end) that is a closed end. Here, the inner pipe 81 perforates through a part of the lower end (downstream end) of the outer pipe 82 that is a closed end.

(3) An opening 83 is provided in a lower end (downstream end) side of the outer pipe 82.

Accordingly, the inner pipe 81 and the outer pipe 82 may have a cross-section of an elliptical shape, or a polygonal shape such as a rectangular, hexagonal or octagonal shape.

Figure 4:
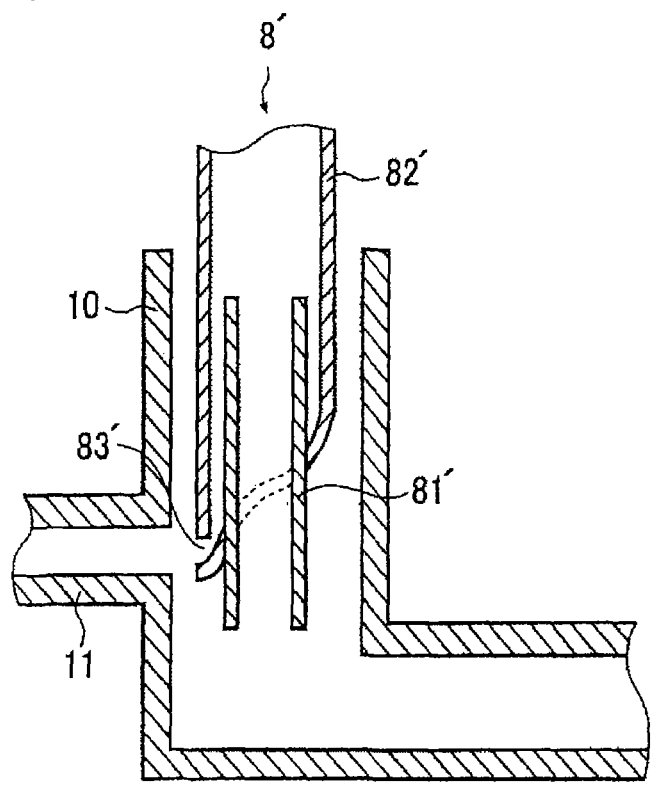
FIG. 4 is a cross-sectional view showing another embodiment of the extension pipe, wherein the shape of the closed end of the outer pipe is different from that of the extension pipe 8 of FIG. 2.

Further, in the extension pipe 8 shown in FIG. 2, the closed end (lower end (downstream end)) of the outer pipe 82 is a horizontal end. However, the shape of the closed end of the outer pipe is not limited thereto. FIG. 4 is a cross-sectional view showing another embodiment of the extension pipe, wherein the shape of the closed end of the outer pipe is different from that of the extension pipe 8 shown in FIG. 2. The extension pipe 8' shown in FIG. 4 is the same as the extension pipe shown in FIG. 2 in that the inner pipe 81' and the outer pipe 82' each constitutes a double pipe structure, but they are different in that the closed end (lower end (downstream end)) of the outer pipe 82' has a shape that it is obliquely inclined.

More specifically, with respect to the length of the outer pipe 82', the length on a side of the pipe facing to the opening of the returning pipe 11 provided in a side portion (side wall) of the downstream side pit 10 is longer than that on the other side of the pipe, whereby the closed end (lower end (downstream end)) of the outer pipe 82' is obliquely inclined.

An opening 83' is provided in a side wall of the outer pipe 82' on a side of the pipe facing to the opening of the returning pipe 11 in the vicinity of the lower end (downstream end). The extension pipe 8' shown in FIG. 4 can guide a boundary laminar flow, that is moving through the gap portion of the double pipe structure, along the closed end (lower end (downstream end)) of the outer pipe 82', that is obliquely inclined, to the direction of the opening 83'.

Here, the open end of the inner pipe 81', that is the upper end (upstream side end) or the lower end (downstream side end), may have a shape that is obliquely inclined. For example, in FIG. 4, when the inner pipe 81' has a shape that the upper end (upstream end) of the inner pipe 81' on its side far from the opening 83' is lower than the upper end (upstream end) of the inner pipe 81' on its side close to the opening 83', the following effect is exhibited. With respect to the moving distance of the boundary laminar flow in the double pipe structure to reach the opening 83', when the upper end (upstream end) of the inner pipe 81' is not inclined, a moving distance of the boundary laminar flow moving through a gap portion on the side of the pipe far from the opening 83', is longer than a moving distance through a gap portion on the side of the pipe close to the opening 83', and accordingly, a pressure loss of the boundary laminar flow moving through the gap portion may be formed. When the shape is inclined so that the upper end (upstream end) of the inner pipe 81' on its side far from the opening 83' is lower than the upper end (upstream end) of the inner pipe 81' on its side close to the opening 83', then, the difference between the moving distance of the boundary laminar flow through a gap portion on the side of the pipe far from the opening 83', and the moving distance of the boundary laminar flow through a gap portion on the side of the pipe close to the opening 83', becomes small, and accordingly, the possibility of forming a pressure loss of the laminar flow moving through the gap portion, becomes small.

The relations of the above formulae (1) to (14) are applicable also to the extension pipe 8' shown in FIG. 4. Here, in the extension pipe 8' shown in FIG. 4, the distance $L_{exit}$ (refer to FIG. 3) from the lower end (downstream side end) of the opening 83 to the lower end (downstream end) of the inner pipe 81, is the distance from the lower end (downstream side end) of the opening 83' to the lower end (downstream end) of the inner pipe 81'. The distance $L_{in}$ from the upper end (upstream end) of the inner pipe 81' to the upper end (upstream side end) of the opening 83', the inner diameter $D_{in}$ of the inner pipe 81', the distance $D_{out-in}$ between the inner diameter of the outer pipe 82' and the outer diameter of the inner pipe 81', the cross-sectional areas of the flow paths in the inner pipe 81' and the outer pipe 82', the area $S_{83}$ of the opening 83' and the area $S_{11}$ of the opening of the returning pipe 11 provided in a side portion (side wall) of the downstream side pit 10, are defined in the same manner as those of the extension pipe 8 shown in FIG. 2.

Figure 5:
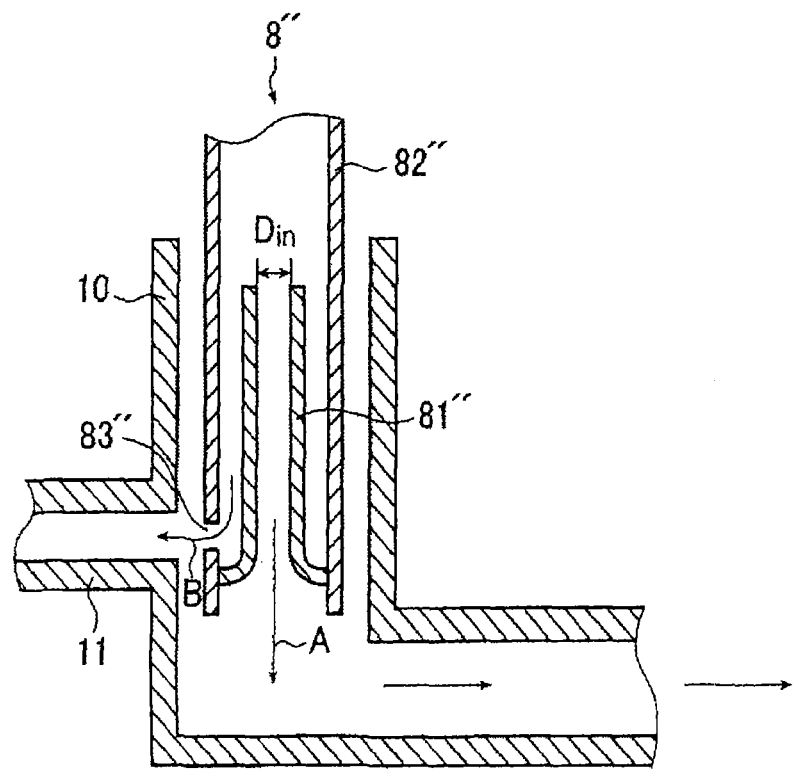
FIG. 5 is a cross-sectional view showing another embodiment of the extension pipe, wherein the shape of inner pipe is different from those of the extension pipes 8, 8' shown in FIGS. 2 to 4.

In the extension pipes 8, 8' shown in FIGS. 2 to 4, the inner pipes 81, 81' are each a hollow cylindrical pipe having a straight pipe shape with a constant diameter (inner diameter, outer diameter) in the entire length, but the shape of the inner pipe is not limited thereto. FIG. 5 is a cross-sectional view showing another embodiment of the extension pipe, wherein the shape of the inner pipe is different from that in the extension pipes 8, 8' shown in FIGS. 2 to 4. In extension pipes 8, 8' shown in FIG. 5, an inner pipe 81" and an outer pipe 82" constitute a double pipe structure in the same manner as the extension pipe 8, 8' shown in FIGS. 2 to 4. However, in the extension pipe 8" shown in FIG. 5, the inner pipe 81" has a part (the lower end (upstream end) vicinity portion in the Figure) wherein the diameter expands to form a taper pipe shape. The lower end (downstream end) of the inner pipe 81" having a taper pipe shape is joined with an inner wall of the outer pipe 82" so as to form a closed end at a lower end (downstream end) of a gap portion between the outer wall of the inner pipe 81" and the inner wall of the outer pipe 82". Accordingly, the lower end (downstream end) of the inner pipe 81" does not protrude from the closed end of the outer pipe 82". In the extension pipe 8" shown in FIG. 5, it is possible to guide the boundary laminar flow moving through the gap portion of the double pipe structure, along the outer wall of the inner pipe 81" having a taper pipe shape, to the direction of the opening 83".

The relations of the above formulae (1) to (14) are applicable to the extension pipe 8" shown in FIG. 5. Here, in the extension pipe 8" shown in FIG. 5, the inner diameter $D_{in}$ of the inner pipe 81" is an inner diameter of a portion of the inner pipe 81" whose diameter is not expanded. The distance $L_{in}$ from the upper end (upstream end) of the inner pipe 81" to the upper end (upstream side end) of the opening 83", the difference $D_{out-in}$ between the inner diameter of the outer pipe 82" and the outer diameter of the inner pipe 81", the cross-sectional areas of the flow paths in the inner pipe 81" and the outer pipe 82", the area $S_{83}$ of the opening 83" and the area $S_{11}$ of the opening of the returning pipe 11 provided in a side portion (side wall) of the downstream side pit 10, are defined in the same manner as those of the extension pipe 8 shown in FIG. 2.

Further, in the extension pipe 8, 8' or 8" shown in FIGS. 2 to 5, the opening 83, 83' or 83" provided in a lower end (downstream end) side of the outer pipe 82, 82' or 82" are each positioned closely to the opening of the returning pipe 11 provided in a side portion (side wall) of the downstream side pit 10, to prevent the boundary laminar flow flown out from the opening 83, 83' or 83" from merging again with the main flow. However, as shown in the extension pipe 8'" shown in FIG. 6, a conduit pipe 84 for guiding the boundary laminar flow flown out from the opening 83'" directly to the opening of the returning pipe 11, may be provided. Here, in the extension pipe 8'" shown in FIG. 6, the opening 83'" is not provided in a side wall of the outer pipe 82'" but provided in a part of a closed end.

Figure 6:
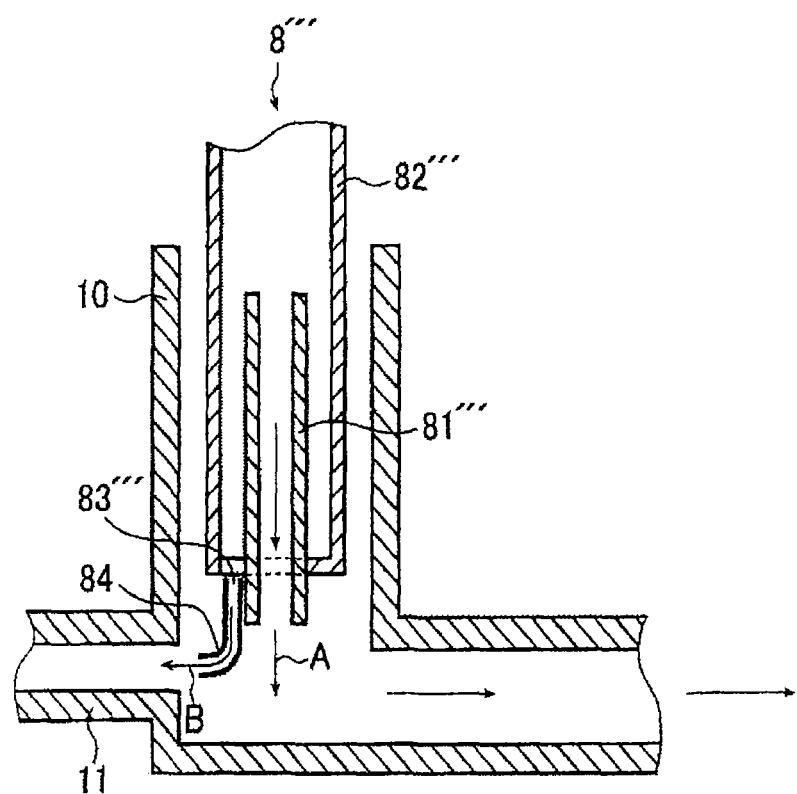
FIG. 6 is a cross-sectional view showing another embodiment of the extension pipe.

The extension pipe 8'" shown in FIG. 6 has a complicated structure, but is excellent in that it can securely separate the boundary laminar flow from the main flow.

In the extension pipe 8, 8' or 8" shown in FIGS. 2 to 5, a single opening portion 83, 83' or 83" is provided in a side wall in the vicinity of the lower end (downstream end) of the outer pipe 82, 82' or 82", and in the extension pipe 8'" shown in FIG. 6, a single opening 83'" is provided in a part of a closed end of the outer pipe 82'". However, the number of openings is not limited thereto, and it may be plural. In this case, the plurality of openings may be provided so as to be arranged at positions of the same height in the outer pipe (that is arranged in a left to right direction), or they may be provided at the same position in the circumferential direction at different heights in the outer pipe (namely, they are vertically arranged). Further, they may be provided in a combined form of these two embodiments (namely, they are arranged in vertical and lateral directions).

Here, when a plurality of openings are provided, $L_{exit}$ is defined as a distance from the lower end (downstream side end) of an opening located at the lowest position, to the lower end (downstream end) of the inner pipe. $L_{in}$ is defined as a distance from the upper end (upstream side end) of an opening located at the highest position to the upper end (upstream end) of the inner pipe. S is defined as the total area of all openings. Here, the above formula (14) is applied to the openings corresponding to each other (that are the opening on the lower end (downstream side end) side of the outer pipe and the opening in the drain out).

The molten glass (boundary laminar flow) separated by the double pipe structure of the extension pipe 8 by the above principle, is returned through the returning pipe 11 to the upstream side pit 9.

The returning pipe 11 is a hollow pipe made of refractory bricks, platinum or a platinum alloy. When the returning pipe 11 is a hollow pipe made of refractory bricks, it is preferably a hollow pipe made of refractory bricks having a rectangular cross section, and the internal shape forming a flow path of molten glass preferably has a rectangular cross section or a circular cross section. Meanwhile, when the returning pipe 11 is a hollow pipe made of platinum or a platinum alloy, the inner cross-sectional shape forming a flow path of molten glass, is preferably a circular or elliptical shape. In any of these cases, in the returning pipe 11, the internal shape forming the flow path of molten glass preferably agrees with the shape of the opening provided in a side face of the downstream side pit 10, for the purpose of preventing slack of the molten glass. Further, in order to prevent increase of flow resistance or generation of pressure loss of molten glass, the cross-sectional area of the returning pipe 11 is preferably constant through the entire length of the returning pipe 11. Accordingly, the cross-sectional area of the returning pipe 11 is preferably substantially the same as the area of the opening provided in a side portion (side wall) of the downstream side pit 10 and the area of the opening provided in a side portion (side wall) of the upstream side pit 9.

Further, the returning pipe 11 is preferably provided so that the path length to the upstream side pit 9 is minimized. For this reason, the returning pipe 11 preferably extends in a horizontal direction towards the upstream side pit 9. Further, in order to prevent increase of flow resistance of molten glass in the returning pipe 11, it is preferred to minimize curved portions provided in the returning pipe 11. In FIG. 1, the returning pipe 11 extends upwardly at a portion where a pumping means 12 is provided, and the returning pipe 11 extends downwardly at a portion where a stirring means 13 is provided. However, the positions of the pumping means 12 and the stirring means 13 may be reversed, and their positions are not limited so long as their functions are obtained.

The dimensions of the returning pipe 11 are appropriately selected depending on a vacuum degassing apparatus to be used. In the case of the returning pipe 11 shown in FIG. 1, a specific example of the dimensions is as follows.

Length in horizontal direction: from 1 to 15 m, preferably from 1 to 12 m, more preferably from 1 to 10 m Width of internal cross-sectional shape: from 0.2 to 7 m, preferably from 0.2 to 5 m, more preferably from 0.2 to 3 m The vacuum degassing apparatus shown in FIG. 1 has a pumping means 12 for controlling the flow of molten glass in the returning pipe 11. The pumping means 12 controls the flow of molten glass in the returning pipe 11, to form a molten glass flow g of a constant flow rate toward the upstream direction (represented by an arrow). By this construction, slack of molten glass in the returning pipe 11 is prevented. Further, it is possible to prevent backflow of molten glass in the returning pipe 11 due to entry of molten glass from the upstream side pit 9 into the returning pipe 11. Further, by the pumping means 12, it is possible to adjust the flow rate of molten glass in the returning pipe 11.

Here, if it is possible to control the molten glass flow in the returning pipe 11 to form a molten glass flow of a constant flow rate toward the upstream direction (indicated by an arrow) without employing the pumping means 12, it is not necessary to use the pumping means. For example, when the difference between the temperature of molten glass in the extension pipe 7 connected to the uprising pipe 4 and the temperature of the molten glass in the extension pipe 8 connected to the downfalling pipe 5, is large, even without employing the pumping means 12, a molten glass flow toward the upstream direction (indicated by an arrow) is formed in the returning pipe 11 by the effect of thermal convection.

The pumping means 12 is not particularly limited so long as it has a heat resistance durable against a high temperature molten glass flow and usable for a molten glass having a high viscosity, and it may be widely selectable from pumping means having a known structure. Among these, an axial flow type pump is preferred for the reason that it has a high durability against high temperature. As the axial flow type pump, one having propeller-shaped blades is widely known, and an axial flow type pump having a spiral blade is particularly preferred since it provides a high efficiency.

In FIG. 1, a pumping means 12 is provided in the vicinity of the center of the returning pipe 11, but the position to provide the pumping means is not particularly limited, and it may be provided at a position closer to the downstream side pit 11, or a position closer to the upstream side pit 9. Further, so long as the molten glass flow in the returning pipe 11 can be properly controlled, the pumping means may be provided in the downstream side pit 10, more specifically, in the vicinity of the opening of the returning pipe 11 in the downstream side pit 10, or in the upstream side pit 9, for example, in the vicinity of the opening of the returning pipe 11 in the upstream side pit 9.

Further, in FIG. 1, a single pumping means 12 is provided in the returning pipe 11, but the number of pumping means 12 is not limited thereto, and a plurality of pumping means may be provided. For example, instead of the stirring means 13 in FIG. 1, an axial flow type pump may be provided as a pumping means.

The vacuum degassing apparatus shown in FIG. 1 has a stirring means 13 for stirring molten glass passing through the returning pipe 11. The stirring means 13 is not an essential constituent, but in order to increase the homogeneity of molten glass returned through the returning pipe 11 to the upstream side pit 9, the stirring means is preferably provided. The stirring means may be widely selectable from known means used for the purpose of stirring molten glass.

Here, as described above, the axial flow type pump has a function of stirring molten glass. When it is possible to sufficiently increase the homogeneity of molten glass by a stirring function of an axial flow type pump provided as the pumping means, an independent stirring means is not necessarily provided.

Further, in the molten glass passing through a conduit structure like the returning pipe 11 provided in the horizontal direction, unevenness of temperature of molten glass may be formed. For example, a molten glass on the bottom side of the returning pipe 11 may have a lower temperature than that of the molten glass on the upper side in some cases. When such an uneven temperature is formed, homogeneity of the molten glass is deteriorated, such being not preferred.

In the first embodiment of the vacuum degassing apparatus of the present invention, in order to prevent formation of an uneven temperature of molten glass passing through the returning pipe 11, a heating means for heating molten glass passing through the returning pipe 11, for example, a means for heating the molten glass from the bottom side of the returning pipe 11, may be provided. When such a heating means is provided, the type of the heating means is not particularly limited, a heating means similar to one used for heating a glass in a glass melting vessel, may be employed. Namely, a means for heating molten glass by combusting a fuel or a means of heating molten glass by using electric power, etc. may be employed.

The second embodiment of the vacuum degassing apparatus of the present invention is the same as the first embodiment of the vacuum degassing apparatus of the present invention except that no extension pipe is attached to a lower end (downstream end) of the downstream pipe, and the downfalling pipe itself is a hollow pipe made of platinum or a platinum alloy having a double pipe structure on its lower end (downstream end) side. Accordingly, in the second embodiment of the vacuum degassing apparatus of the present invention, the lower end (downstream end) of the downfalling pipe is fit into the open end of the downstream side pit, and is immersed in molten glass in the downstream side pit.

In the second embodiment of the vacuum degassing apparatus of the present invention, the double pipe structure of the downfalling pipe functions as a separating mechanism for separating a boundary laminar flow containing many bubbles from a main flow of molten glass moving from the downfalling pipe to the downstream side pit.

Here, features to be satisfied by the downfalling pipe having a double pipe structure, are similar to those described with respect to the double pipe structure of the extension pipe in the first embodiment of the vacuum degassing apparatus of the present invention.

Next, a third embodiment of the vacuum degassing apparatus of the present invention will be described.

Figure 7:
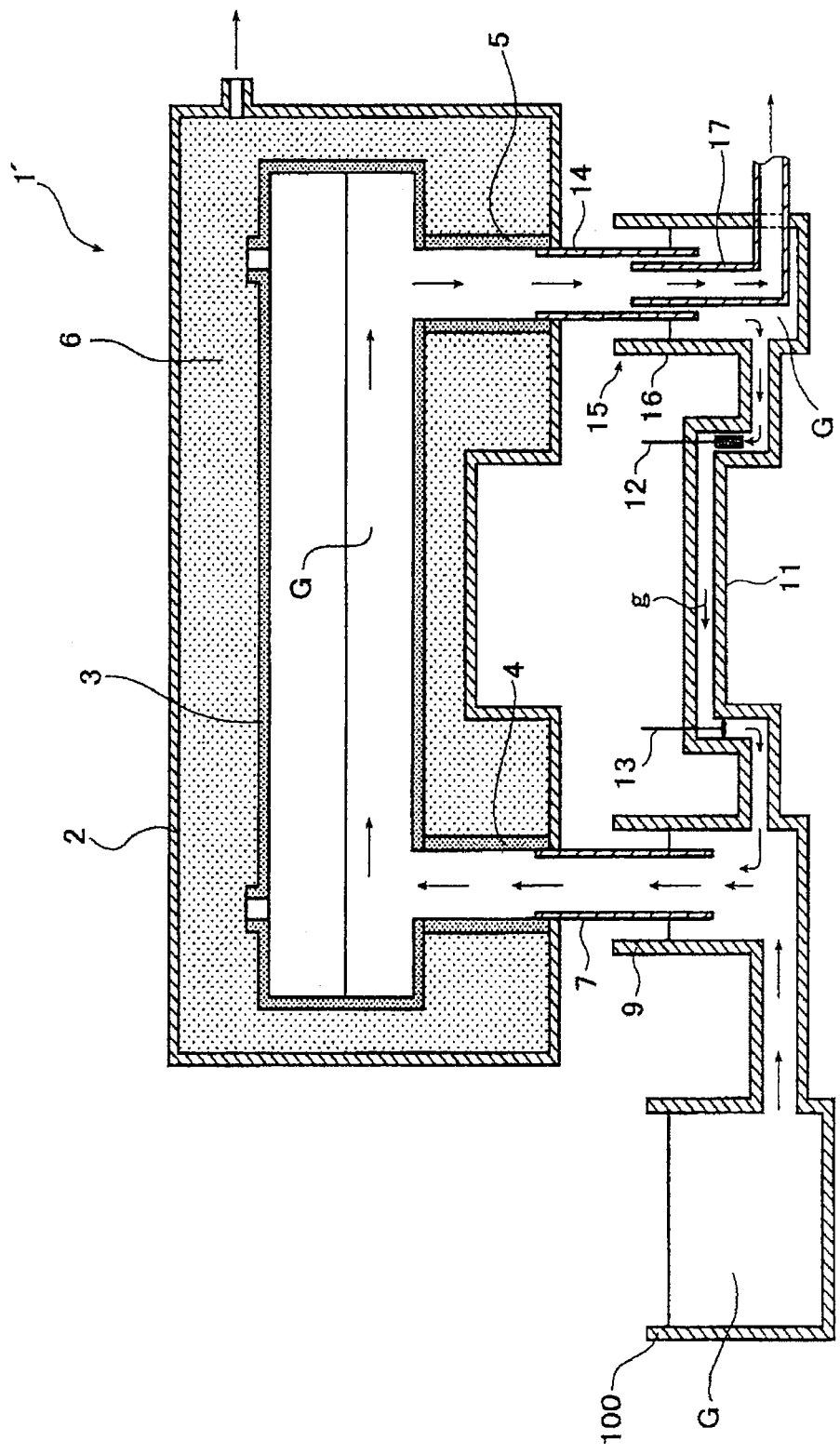
FIG. 7 is a cross-sectional view showing a third embodiment of the vacuum degassing apparatus of the present invention.

FIG. 7 is a cross-sectional view showing the third embodiment of the vacuum degassing apparatus of the present invention. The vacuum degassing apparatus 1' shown in FIG. 7 is the same as the vacuum degassing apparatus 1 shown in FIG. 1 except for the following differences.

An extension pipe 14 connected to a lower end side (downstream end) of the downfalling pipe 15 does not have a double pipe structure.

A downstream side pit 15 has a structure to be described later.

Figure 8:
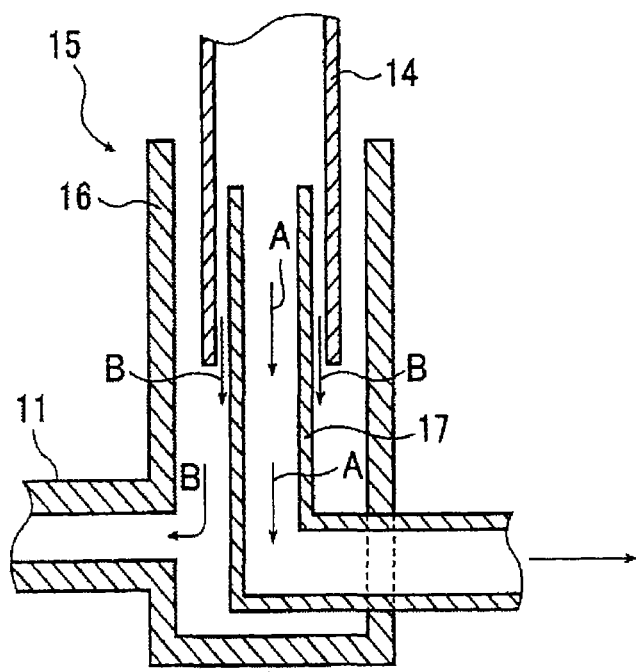
FIG. 8 is a partial enlarged view showing the downstream side pit 15 and its vicinity of the vacuum degassing apparatus 1' shown in FIG. 7.

FIG. 8 is a partial enlarged view showing the downstream side pit 15 and its vicinity of the vacuum degassing apparatus 1' shown in FIG. 7. The downstream side pit 15 shown in FIG. 8 has a double pipe structure constituted by a pit main body 16 forming an outer pipe, an inner pipe 17 located in the pit main body 16 and extending in the downstream direction. This double pipe structure functions as a separating mechanism for separating a boundary laminar flow containing many bubbles from a main flow of molten glass G moving from the downfalling pipe 5 to the downstream side pit 15.

The pit main body 16 has a cylindrical body having an open upper end (upstream end) and a closed bottom, wherein the shape of the opening of the upper end (upstream end) is, for example, a rectangular shape such as a square shape or a circular shape. An opening of the returning pipe 11 is provided in a side portion (side wall) of the pit main body 16. Here, the position to provide the opening of the returning pipe 11 is not limited to the side portion (side wall) of the pit main body 16, but it may be provided in a bottom of the pit main body 16.

The inner pipe 17 is a hollow cylindrical pipe having open ends, and its cross-sectional shape is, for example, a circular shape. The inner pipe 17 has one end located on the upstream side of the pipe along the flow direction of molten glass, that is, on the downfalling pipe 5 side of the pipe, more specifically, on a side of the pipe close to the extension pipe 14 that is attached to a lower end (downstream end) of the downfalling pipe 5. The inner pipe 17 has the other end perforating through a side portion (side wall) of the pit main body 16 and extending in the downstream direction along the flow direction of molten glass. The entire shape of the inner pipe 17 is substantially an L shape.

The pit main body 16 and the inner pipe 17 are usually made of platinum or a platinum alloy. When the pit main body 16 and the inner pipe 17 are made of platinum or a platinum alloy, their cross-sectional shapes are each a circular or elliptical shape for the reason of easiness of fabrication or hardness of deformation, etc.

Here, the pit main body 16 and the inner pipe 17 may be made of refractory bricks. When the pit main body 16 and the inner pipe 17 are made of refractory bricks, their cross-sectional shapes are each a polygonal shape such as a rectangle, a circular or elliptical shape for the reason of easiness of fabrication or prevention of corrosion of refractory bricks, etc.

In FIG. 8, the extension pipe 14 and the inner pipe 17 partially overlap with each other. More specifically, the upper end (upstream end) of the inner pipe 17 is located inside the extension pipe 14, whereby they overlap with each other. However, it is not required that the extension pipe 14 and the inner pipe 17 partially overlap, but it is acceptable that they do not overlap with each other.

Further, in the vacuum degassing apparatus 1' shown in FIG. 7, the extension pipe 14 made of platinum or a platinum alloy attached to a lower end (downstream end) of a downfalling pipe 5 made of refractory bricks or platinum or a platinum alloy, is immersed in molten glass in a downstream side pit 15 (pit main body 16). However, a downfalling pipe made of platinum or a platinum alloy is immersed in molten glass in a downstream side pit in some vacuum degassing apparatuses. In such a case, the downfalling pipe made of platinum or a platinum alloy directly overlaps with an inner pipe of a downstream side pit. The third embodiment of the vacuum degassing apparatus of the present invention includes such a construction.

Hereinafter, in this specification, "a downstream pipe and an inner pipe of downstream side pit overlap" includes both of the following cases (a) and (b).

(a) An extension pipe made of platinum or a platinum alloy attached to a lower end (downstream end) of a downfalling pipe made of refractory bricks, platinum or a platinum alloy, overlaps with an inner pipe of a downstream side pit.

(b) A downfalling pipe made of platinum or a platinum alloy directly overlaps with an inner pipe of a downstream side pit.

In the third embodiment of the vacuum degassing apparatus of the present invention, the following points should be noted to properly separate a boundary laminar flow from a main flow. Please refer to FIG. 9 for the following points. Here, FIG. 9 is the same as FIG. 8 except that symbols showing dimensions of portions are added.

Figure 9:
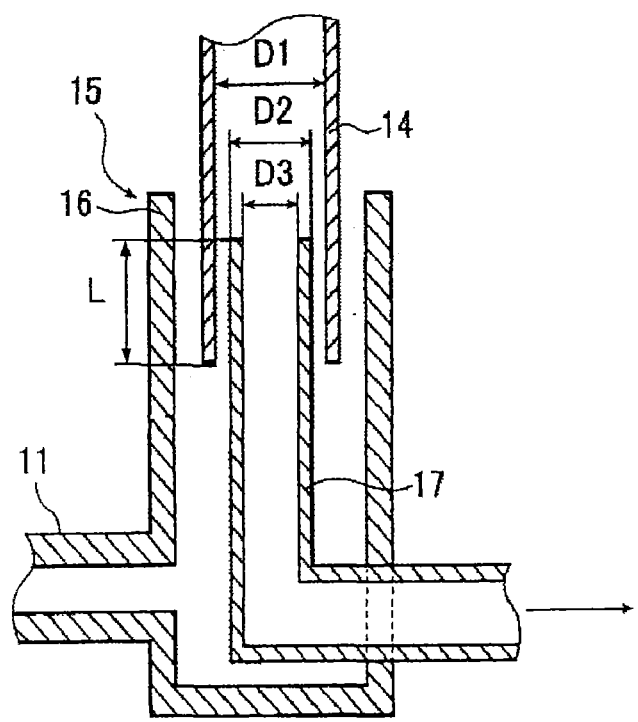
FIG. 9 is a view similar to FIG. 8, which further shows symbols showing dimensions of specific portions in the Figure.

In FIG. 9, the inner diameter $D_1$ (mm) of the extension pipe 14 and the outer diameter $D_2$ (mm) of the inner pipe 17 preferably satisfy the relation represented by the following formula (15).

$$D_1 > D_2 \tag{15}$$

Namely, in the third embodiment of the vacuum degassing apparatus of the present invention, when the downfalling pipe (including a case where it is an extension pipe) overlaps with an inner pipe of a downstream side pit, they have a positional relationship that the upper end (upstream end) of the inner pipe of the downstream side pit is located inside the downfalling pipe.

In the third embodiment of the vacuum degassing apparatus of the present invention, when the extension pipe and the inner pipe have the above positional relationship, the following effects will be exhibited.

When a molten glass flow containing a boundary laminar flow reaches an overlap portion of the extension pipe 14 and the inner pipe 17 in FIG. 8, the boundary laminar flow containing many bubbles moves into a region that belongs to a gap between the inner wall of the extension pipe 14 and the outer wall of the inner pipe 17, that is, a gap portion between the inner wall of the extension pipe 14 and the outer wall of the inner pipe 17 (indicated by an arrow B in the Figure). Meanwhile, the main flow other than the boundary laminar flow moves into the inner pipe 17 (represented by an arrow A in the Figure). As a result, the boundary laminar flow is physically separated from the main flow.

The main flow moving inside the inner pipe 17 moves along the direction of the arrow A in the Figure. Namely, it moves to the downstream direction in the inner pipe 17. Meanwhile, the boundary laminar flow moving in the gap portion between the inner wall of the extension pipe 14 and the outer wall of the inner pipe 17, moves along the direction of the arrow B in the Figure, and moves through an opening provided in a side portion (side wall) of the pit main body 16 into the returning pipe 11.

Thus, the boundary laminar flow is physically separated from the main flow, and only the main flow from which bubbles are sufficiently removed by vacuum degassing, is supplied to a forming apparatus. On the other hand, the boundary laminar flow containing many bubbles moves in the returning pipe 11, to be sent to an upstream side pit 9. The boundary laminar flow that has reached the upstream side pit 9 moves up through an uprising pipe 4 (more specifically, an extension pipe 7 and the uprising pipe 4) along with molten glass newly supplied from a melting vessel 100, to be sent to a vacuum degassing vessel 3.

In order to physically separate the boundary laminar flow from the main flow, the difference $\Delta D$ (mm) between the inner diameter $D_1$ (mm) of the extension pipe 14 and the outer diameter $D_2$ of the inner pipe 17, preferably satisfies the relation represented by the following formula (16) with the inner diameter $D_3$ (mm) of the inner pipe 17.

$$\Delta D \geq 0.04 \times D_3 \tag{16}$$

When $\Delta D$ and $D_3$ satisfy the relation represented by the above formula (16), the width of a gap portion between the inner wall of the extension pipe 14 and the outer wall of the inner pipe 17, that is $\Delta D/2$, is sufficient for physically separating the boundary laminar flow from the main flow.

$\Delta D$ is specifically preferably at least 10 mm, more preferably at least 20 mm, particularly preferably at least 40 mm and at most 200 mm. If $\Delta D$ exceeds 200 mm, the width of the gap between the inner wall of the extension pipe 14 and the outer wall of the inner pipe 17 becomes too large with respect to the thickness of the boundary laminar flow, and the flow rate of main flow decreases, such being not preferred.

In FIG. 8, it is preferred that only the boundary laminar flow is separated to move to a gap portion between the inner wall of the extension pipe 14 and an outer wall of the inner pipe 17. In order to achieve this, it is ideal that the width of the gap portion between the inner wall of the extension pipe 14 and the outer wall of the inner pipe 17 is substantially same as the thickness of the boundary laminar flow.

However, the thickness of the boundary laminar flow at a time of carrying out vacuum degassing, is not always constant and it may vary. Accordingly, in order to securely separate the boundary laminar flow to move it into the gap portion between the inner wall of the extension pipe 11 and the outer wall of the inner pipe 17, the width of the gap portion is preferably larger by a certain extent than the thickness of the boundary laminar flow. In this case, a part of main flow is also separated and moves into the gap portion.

Accordingly, when the width of the gap portion between the inner wall of the extension pipe 14 and the outer wall of the inner pipe 17, is excessively larger than the thickness of the boundary laminar flow, the amount of the main flow separated to move into the gap portion increases to decrease the yield of the production of glass, such being not preferred.

In the third embodiment of the vacuum degassing apparatus, $\Delta D$ (mm) and $D_3$ (mm) preferably satisfy the relation represented by the following formula (17), more preferably satisfy the relation represented by the following formula (18).

$$\Delta D \geq 0.08 \times D_3 \tag{17}$$

$$0.1 \times D_3 \leq \Delta D \leq 0.6 \times D_3 \tag{18}$$

Here, $D_3$ is usually from 50 to 900 mm, more preferably from 100 to 700 mm.

The wall thicknesses of the inner pipe 17 and the extension pipe 14, that are made of platinum or a platinum alloy, are preferably from 0.4 to 6 mm, more preferably from 0.8 to 4 mm.

For the above reasons, the outer diameter $D_2$ of the inner pipe 17 is preferably from 51 to 912 mm, more preferably from 102 to 708 mm. The outer diameter of the extension pipe 14 is preferably from 60 to 1,300 mm, more preferably from 123 to 1,000 mm.

Further, in order to physically separate the boundary laminar flow from the main flow, the cross-sectional area difference $\Delta S$ (mm$^2$) obtained by subtracting the cross-sectional area of a flow path in the inner pipe 17 from the cross-sectional area of a flow path in the extension pipe 14, preferably satisfies the relation represented by the following formula (19) with the cross-sectional area $S_1$ (mm$^2$) of a flow path in the inner pipe 17.

$$\Delta S \leq S_1 \tag{19}$$

Here, the cross-sectional area of a flow path in the extension pipe 14 or in the inner pipe 17, means a cross-sectional area in a plane perpendicular to the longitudinal direction of the flow path in the extension pipe 14 or the inner pipe 17. When $\Delta S$ and $S_1$ satisfy the relation represented by the formula (19), the width of the gap portion between the inner wall of the extension pipe 14 and the outer wall of the inner pipe 17 does not become too large with respect to the thickness of the boundary laminar flow, and accordingly, the amount of main flow separated to move into the gap portion does not increase. Accordingly, the yield of production of glass does not decrease.

Further, it is preferred that $0.50 \times S_1 \leq \Delta S$ is satisfied.

In the third embodiment of the vacuum degassing apparatus of the present invention, it is preferred that there is an overlap portion. If the overlap portion is present, the effect of separating the boundary laminar flow from the main flow increases, such being preferred.

The length L (mm) of the overlap portion and the outer diameter $D_2$ (mm) of the inner pipe 17 preferably satisfy the relation represented by the following formula (20).

$$L \geq 0.5 \times D_2 \tag{20}$$

In the vacuum degassing apparatus 1' having the structure shown in FIG. 7, in order to adjust the height of the level of molten glass G in the vacuum degassing vessel 3, it is necessary to move up and down the vacuum degassing vessel 3 by maximum about 600 mm. At this time, the extension pipe 14 moves up and down in accordance with the movement of the vacuum degassing vessel 3. Accordingly, the length L of the overlap portion changes in accordance with the movement of the vacuum degassing vessel 3, and L is minimized when the vacuum degassing vessel 3 moves up to the maximum position.

In all states including the state that L is minimized, L and $D_2$ preferably satisfy the relation represented by the above formula (20). Here, as described above, L may be 0 (that is, the extension pipe 14 and the inner pipe 17 do not overlap with each other).

Further, since the upper end (upstream end) of the inner pipe may move into the extension pipe (downfalling pipe) too much, L preferably satisfies the following formula (21).

$$L \leq 5 \times D_2 \tag{21}$$

When L and $D_2$ satisfy the relation represented by the above formula (20) in all states including a state that L is minimized, regardless of the movement of the vacuum degassing vessel 3, the length L of the gap portion between the inner wall of the extension pipe 14 and the outer wall of the inner pipe 17, is sufficient for physically separating the boundary laminar flow from the main flow. Further, even if the vacuum degassing vessel 3 is moved up and down in the maximum range, the leading edge of the extension pipe 14 is always immersed in molten glass G in the downstream side pit 15 (pit main body 16).

$D_2$ changes depending on the size of the vacuum degassing apparatus, particularly on the flow rate (t/day) of molten glass passing through the vacuum degassing apparatus, but it is usually from 51 to 912 mm, more preferably from 102 to 708 mm. L is preferably at least 30 mm and at most 1,000 mm, more preferably at least 50 mm and at most 700 mm. If L exceeds 1,000 mm, increase of L does not contribute to separation of the boundary laminar flow from the main flow any more, and the length of the overlap portion becomes extremely long, which increases the cost.

Here, the length of the extension pipe 14 itself is usually from 200 to 3,000 mm, more preferably from 400 to 1,500 mm. Since the inner pipe 17 extends in the downstream direction in the Figure, the length is not particularly limited. However, the length of the inner pipe 17 is preferably from 50 mm to 600 mm, more preferably from 100 mm to 500 mm.

In the third embodiment of the vacuum degassing apparatus of the present invention, it is sufficient that the downstream side pit has a double pipe structure comprising a pit main body being an outer pipe and an inner pipe located inside the pit main body and extending in the downstream direction, and the double pipe structure is not limited to one wherein the extension pipe 14 overlaps with the inner pipe 17 as shown in FIG. 8.

Figure 10:
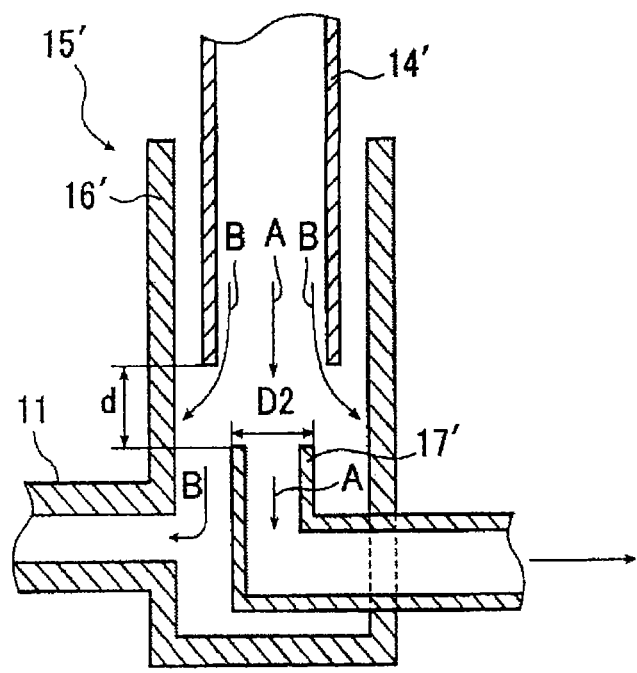
FIG. 10 is an enlarged cross-sectional view showing a downstream side pit and its vicinity of another example of the third embodiment of the vacuum degassing apparatus of the present invention, wherein the relation between the extension pipe and the inner pipe is different from that in the construction shown in FIG. 9.

FIG. 10 is a partial enlarged view showing a downstream side pit and its vicinity in another example of the third embodiment of the vacuum degassing apparatus of the present invention. This example is the same as the example shown in FIG. 8 except that the relation between the extension pipe and the inner pipe is different.

In the example shown in FIG. 10, the extension pipe 14' does not overlap with the inner pipe 17', and the lower end (downstream end) of the extension pipe 14' is isolated from the upper end (upstream end) of the inner pipe 17'. Since they do not overlap, it is not only possible to simplify the platinum conduit itself but also to simplify the design of the equipment.

Here, no-overlap may be recognized as a simple design change, but it is not true. It should be noted that there is a difficulty unique to an apparatus for molten glass.

A piece of glass production equipment is continuously operated for an extremely long time (about from 2 to 15 years) once it is assembled and flow of molten glass is started. Accordingly, if any mistake occurs, it is extremely difficult to repair, and a total rebuilding becomes necessary. Further, since molten glass has an extremely high temperature of at least 1,200° C., it is extremely difficult to directly observe the flow. Accordingly, an apparatus for molten glass is preferably designed to be an apparatus not having any problem later, and at the same time, to be an extremely simple apparatus in some cases.

This invention of no-overlap contributes extremely significantly in the point that the object of the present invention can be achieved without overlap.

When molten glass flow containing the boundary laminar flow reaches the lower end (downstream end) of the extension pipe 14' shown in FIG. 10, a boundary laminar flow containing many bubbles moves along the direction of an arrow B at the lower end (downstream end) of the extension pipe 14'. Namely, from the lower end (downstream end) of the extension pipe 14', it spreads to the outside and moves in a gap between the inner wall of the pit main body 16' and the outer wall of the inner pipe 17'. Meanwhile, a main flow moves along the direction of the arrow A, and moves into the inner pipe 17'. As a result, the boundary laminar flow is physically separated from the main flow.

In the example shown in FIG. 10, the reason why the boundary laminar flow moves along the direction of the arrow B, is described as follows.

In a portion between the lower end (downstream end) of the extension pipe 14' and the upper end (upstream end) of the inner pipe 17', a pressure difference is formed between the central portion of the pit main body 16', in which the main flow flows, and the outer periphery (in the vicinity of the inner wall) of the pit main body 16', whereby the pressure along the outer periphery (in the vicinity of the inner wall) of the pit main body 16' is lower than the pressure in the vicinity of the center of the pit main body 16'. By this pressure difference, the boundary laminar flow moves along the direction of the arrow B.

In the example shown in FIG. 10, the main flow moves along the direction of the arrow A in the Figure into the inner pipe 17', and moves in the downstream direction. Meanwhile, the boundary laminar flow moves along the direction of the arrow B in the Figure into the gap portion between the inner wall of the pit main body 16' and the outer wall of the inner pipe 17', and moves through the opening provided in a side portion (side wall) of the pit main body 16' into the returning pipe 11. Thus, the boundary laminar flow is physically separated from the main flow, and only the main flow from which bubbles are sufficiently removed by vacuum degassing is supplied to a forming apparatus. Meanwhile, the boundary laminar flow containing many bubbles moves in the returning pipe 11, to be sent to the upstream side pit 9. The boundary laminar flow that has reached the upstream side pit 9, moves through the uprising pipe 4 (more specifically, the extension pipe 7 and the uprising pipe 4) along with molten glass newly supplied from a melting vessel 100, to be sent to the vacuum degassing vessel 3.

In the example shown in FIG. 10, the distance d (mm) between the lower end (downstream end) of the extension pipe 14' and the upper end (upstream end) of the inner pipe 17', preferably satisfies the relation represented by the following formula (22) with the outer diameter $D_2$ (mm) of the inner pipe 17'.

$$0 \leq d \leq 5 \times D_2 \quad (22)$$

When d and $D_2$ satisfy the above formula (22), the distance between the lower end (downstream end) of the extension pipe 14' and the upper end (upstream end) of the inner pipe 17', is sufficient for physically separating the boundary laminar flow from the main flow. More specifically, when d and $D_2$ satisfy the above formula (22), the boundary laminar flow moves along the direction of the arrow B, while the main flow moves along the direction of the arrow A. Accordingly, there is no risk that a part of the main flow moves along the direction of the arrow B, and that a part of the boundary laminar flow moving along the direction of the arrow B merges again with the main flow.

d and $D_2$ preferably satisfy the following formula (23), more preferably satisfy the following formula (24).

$$0.5 \times D_2 \leq d \leq 4 \times D_2 \quad (23)$$

$$0.5 \times D_2 \leq d \leq 2 \times D_2 \quad (24)$$

$D_2$ is defined in the same manner as one in the example shown in FIG. 8, and it is usually from 51 to 912 mm, more preferably from 102 to 708 mm. d is preferably at least 30 mm and at most 1,000 mm, more preferably at least 50 mm and at most 700 mm.

Here, the dimensions of the extension pipe 14' and the inner pipe 17' are similar to those described in the example shown in FIG. 8.

Figure 11:
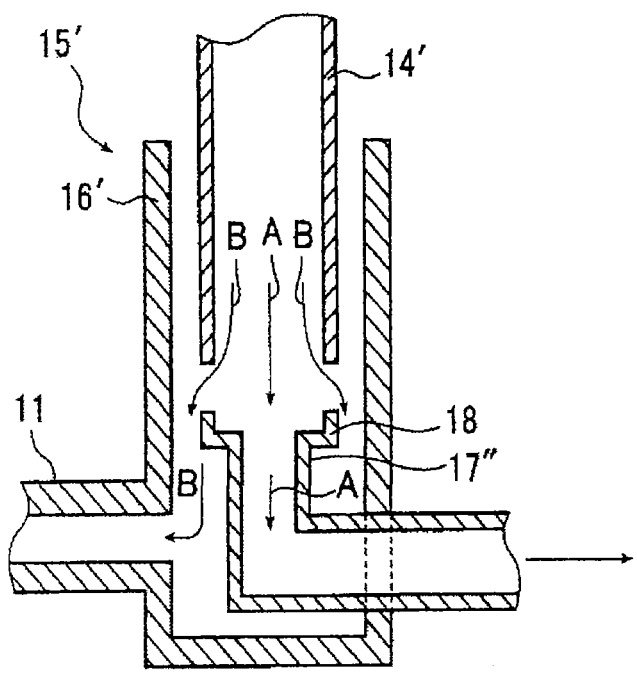
FIG. 11 is a view similar to FIG. 10, wherein the shape of the upper end (upstream end) of the inner pipe is different from that of FIG. 10.

FIG. 11 is a partial enlarged view showing a downstream side pit and its vicinity in another example of the third embodiment of the vacuum degassing apparatus of the present invention. In the example shown in FIG. 11, the shape of the upper end (upstream end) of the inner pipe 17" is different from that of the inner pipe 17' of FIG. 12. Namely, in the example shown in FIG. 11, a diameter-expanding portion 18 is provided at the upper end (upstream end) of the inner pipe 17". In the example shown in FIG. 11, since the diameter-expanding portion 18 is provided at the upper end (upstream end) of the inner pipe 17", it is possible to increase the flow rate of the main flow while design change for the equipment is minimized.

Here, the diameter-expanding portion 18 is not limited to one shown in FIG. 11 wherein the diameter decreases rapidly, but it may be one wherein the diameter decreases slopewisely or stepwisely.

In the example shown in FIG. 10 or FIG. 11, the inner diameter $D_1$ (mm) of the extension pipe 14' and the outer diameter $D_2$ (mm) of the inner pipe 17' or 17", preferably satisfy the relation represented by the following formula (25).

$$0.98 \times D_2 \leq D_1 \leq 2.5 \times D_2 \quad (25)$$

Here, as shown in FIG. 11, when a diameter-expanding portion 18 is provided at the upper end (upstream end) of the inner pipe 17", the outer diameter $D_2$ of the inner pipe 17" means the outer diameter of the diameter-expanding portion 18.

When the inner diameter $D_1$ of the extension pipe 14' and the outer diameter $D_2$ of the inner pipe 17' or 17" satisfy the relation represented by the above formula (25), the difference between the inner diameter of the extension pipe 14' and the outer diameter of the inner pipe 17' or 17", is not significantly large, such being suitable for physically separating the boundary laminar flow from the main flow. When the difference between the inner diameter of the extension pipe 14' and the outer diameter of the outer pipe 17' or 17", is significantly large, it may not be possible to sufficiently separate the boundary laminar flow from the main flow (when the outer diameter of the inner pipe 17' or 17" is large). Further, the amount of the main flow separated into the boundary laminar flow side increases to reduce the yield of production of glass, such being not preferred (when the inner diameter of the extension pipe 14' is large).

Next, a fourth embodiment of the vacuum degassing apparatus of the present invention will be described.

Figure 12:
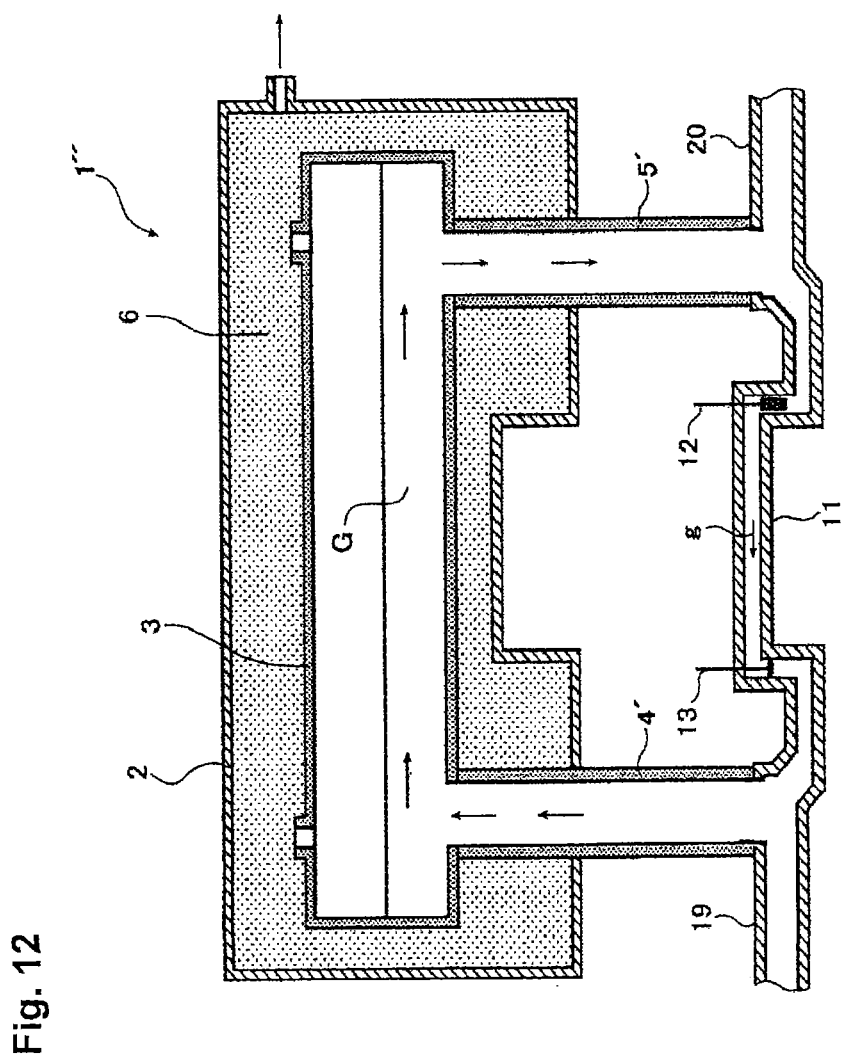
FIG. 12 is a cross-sectional view showing a fourth embodiment of the vacuum degassing apparatus of the present invention.

FIG. 12 is a cross-sectional view showing the fourth embodiment of the vacuum degassing apparatus of the present invention. The vacuum degassing apparatus 1" shown in FIG. 12 is the same as the vacuum degassing apparatus 1 shown in FIG. 1 except for the following differences.

The structure is not such that the lower ends of the extension pipes connected to the upstream pipe and the downstream pipe, respectively, are immersed in molten glass in the upstream side pit and the downstream side pit, respectively, but the structure is such that the upstream pipe 4' and the downstream pipe 5' communicate with the upstream side pit 19 and the downstream side pit 20, respectively, so as to be filled with molten glass (difference 1).

There is no double pipe structure functioning as a separating mechanism that is present in the first to third embodiments of the vacuum degassing apparatus of the present invention (difference 2).

The vacuum degassing apparatus 1" shown in FIG. 12 has a structure that the uprising pipe 4' and the downfalling pipe 5' are connected with the upstream side pit 19 and the downstream side pit 20, respectively, so as to be filled with molten glass, whereby the structure has such merits that the structure is rigid and the cost for building the apparatus can be saved.

However, since the vacuum degassing apparatus 1" shown in FIG. 12 has a structure that the uprising pipe 4' and the downfalling pipe 5' are connected with the upstream side pit 19 and the downstream side pit 20, respectively, so as to be filled with molten glass, it is not possible to maintain the level of the molten glass G in the vacuum degassing vessel 3 constant by moving up and down the vacuum degassing vessel 3 when the degree of vacuum in the vacuum degassing vessel 3 is compensated. Accordingly, when the level of molten glass G in the vacuum degassing vessel 3 changes, the change affects the effect of vacuum degassing. Particularly, when the level of molten glass G in the vacuum degassing vessel 3 rises, the vacuum degassing effect is decreased to cause a problem that a boundary laminar flow containing many bubbles increases.

However, in the vacuum degassing apparatus 1" shown in FIG. 12, a boundary laminar flow containing many bubbles is separated by a separating mechanism from a main flow of molten glass G moving from the downfalling pipe 5' to the downstream side pit 20, and the boundary laminar flow is returned through a returning pipe 11 to the vacuum degassing vessel 3. Accordingly, it is possible to suppress the influence of decrease of vacuum degassing effect.

However, in the fourth embodiment of the vacuum degassing apparatus of the present invention, the difference 1 is not an essential construction, but in the same manner as the first to third embodiments of the vacuum degassing apparatus of the present invention, the construction may be such that the lower ends of the extension pipes connected to the uprising pipe and the downfalling pipe, respectively, are immersed in molten glass in the upstream side pit and the downstream side pit, respectively.

In the fourth embodiment of the vacuum degassing apparatus of the present invention, the opening of the returning pipe 11 opening in the downstream side pit 20 so as to satisfy the following conditions (1) and (2), functions as a separating mechanism for separating a boundary laminar flow containing many bubbles from a main flow of molten glass G moving from the downfalling pipe 5' to the downstream side pit 20.

(1) The opening crosses a part of an imaginary region obtained by imaginarily extending the downfalling pipe 5' in the downstream direction.

(2) The opening does not cross an imaginary line obtained by imaginarily extending the central axis of the downfalling pipe 5' in the downstream side.

Figure 13:
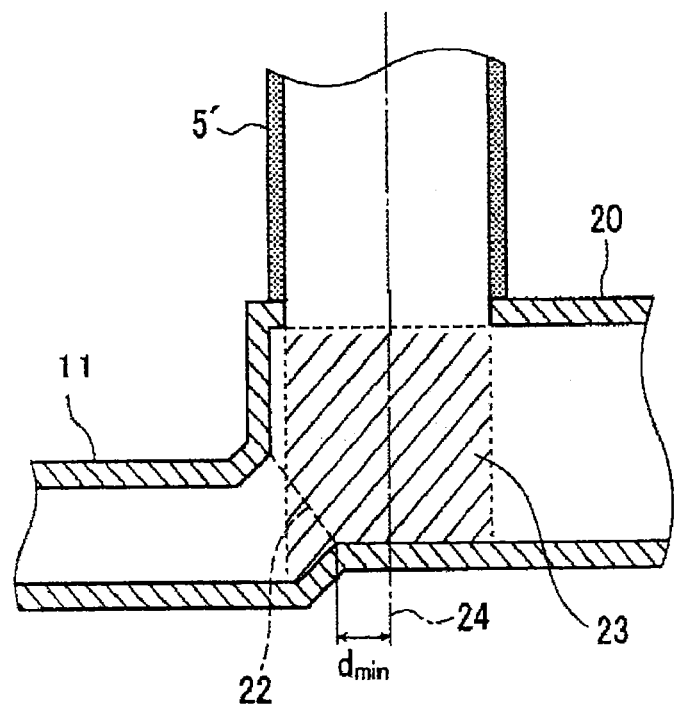
FIG. 13 is a partial enlarged view showing a downstream side pit and its vicinity of the vacuum degassing apparatus 1" shown in FIG. 12.

The above conditions (1) and (2) will be described with reference to FIG. 13. FIG. 13 is a partial enlarged view showing a downstream side pit and its vicinity in a vacuum degassing apparatus 1" shown in FIG. 12.

In FIG. 13, the returning pipe 11 extends from a left side of a downstream side pit 20 in the Figure, that is, from the vicinity of the lower end of a side portion (side wall) in the upstream side in the horizontal direction, towards the upstream side in the horizontal direction. An opening 22 (represented by a broken line) of the returning pipe 11 is provided in the vicinity of a lower end of a side portion (side wall) on the upstream side in the horizontal direction of the downstream side pit 20, and crosses a part of an imaginary region 23 (represented by the hatched portion) obtained by imaginarily extending a downfalling pipe 5' in the downstream direction. Here, in this specification, the imaginary region obtained by extending the downfalling pipe in the downstream direction, means, as shown in FIG. 13, not a region obtained by extending the outer diameter of the downfalling pipe 5' in the downstream direction, but a region obtained by extending the inner diameter of the downfalling pipe 5' in the downstream direction. By such a construction, a boundary laminar flow flowing along a wall face of the downfalling pipe 5' on a left side of the Figure, that is, along a wall face of the downfalling pipe 5' on the upstream side in the flow direction of molten glass G in the horizontal direction, is separated from the main flow, to move through the opening 22 to move into the returning pipe 11.

In FIG. 13, the opening 22 does not cross an imaginary line 24 (represented by a broken line) obtained by imaginarily extending the central axis of the downfalling pipe 5' in the downstream direction. By this construction, it is possible to efficiently introduce the boundary laminar flow portion from the main flow into the returning pipe 11.

Accordingly, in the fourth embodiment of the vacuum degassing apparatus of the present invention, in the boundary laminar flow flowing along the wall face of the downfalling pipe 5', a boundary laminar flow flowing along a wall face of the downfalling pipe 5' in the upstream side in the horizontal direction, that is on the left side in the Figure, is separated.

As described above, the reasons why bubbles in molten glass increase in spite of carrying out vacuum degassing, are generation of bubbles on the interface between molten glass and a wall face of a conduit for molten glass, and lowering of vacuum degassing effect due to rise of level of molten glass in a vacuum degassing vessel.

For glasses such as glasses for buildings or automobiles for which the bubble quality requirement is not very strict, it is sufficient that a boundary laminar flow containing bubbles mainly caused by the second reason is separated and returned to a vacuum degassing vessel to be subjected to vacuum degassing again.

As described above, the boundary laminar flow produced by lowering of vacuum degassing effect due to rise of molten glass level in a vacuum degassing vessel, flows along a wall face of a downfalling pipe 5 on the upstream side in the horizontal direction of the pipe, that is on the left side of the pipe in the Figure, and accordingly, it is possible to separate such a boundary laminar flow from a main flow by using the fourth embodiment of the vacuum degassing apparatus of the present invention. Further, in a boundary laminar flow produced by generation of bubbles on the interface between molten glass and a wall face of a conduit for molten glass, a portion flowing along a wall face of the downfalling pipe 5' on the upstream side in the horizontal direction of the pipe, that is on the left side of the pipe in the Figure, can be separated by using the fourth embodiment of the vacuum degassing apparatus of the present invention.

On the other hand, for such a glass to be employed for flat panel display panels for which the bubble quality required for the glass is extremely strict, it is preferred to employ the first to third embodiments of the vacuum degassing apparatus of the present invention for separating a boundary laminar flow from a main flow by a double pipe structure, to separate a boundary laminar flow caused by generation of bubbles on the interface between molten glass and a wall face of a conduit for molten glass as well as a boundary laminar flow caused by lowering of vacuum degassing effect due to rise of molten glass level in a vacuum degassing vessel.

Here, when any of the first to third embodiments of the vacuum degassing apparatus of the present invention is employed, a boundary laminar flow forming a surface layer of a flow of molten glass G in the vacuum degassing vessel 3 can also be properly separated. In some vacuum degassing conditions, non-broken bubbles are present on a surface of molten glass in the vacuum degassing vessel, which form a surface layer of the flow of molten glass G moving in the vacuum degassing vessel.

When the flow of molten glass G moves to the downfalling pipe, the surface layer of the flow of molten glass G containing non-broken bubbles tends to U-turn along a wall face of a downstream end of the vacuum degassing vessel and move into the downfalling pipe. As a result, rather than a boundary laminar flow flowing along a wall face of the downfalling pipe on the upstream side in the horizontal direction of the pipe, a boundary laminar flow flowing along a wall face of the downfalling pipe on the downstream side in the horizontal molten glass flow direction (hereinafter referred to as "downstream side in horizontal direction") of the pipe, tends to contain more bubbles. By employing the first to third embodiments of the vacuum degassing apparatus of the present invention which separate a boundary laminar flow from a main flow by a double-pipe structure, such a boundary laminar flow can also be suitably separated.

Returning to the fourth embodiment of the vacuum degassing apparatus of the present invention, in order to provide an opening 22 so as to satisfy the above conditions (1) and (2), as evident from FIG. 13, it is sufficient that an end of the returning pipe 11, more specifically an end of the opening 22 of the returning pipe 11, is located in the imaginary region 23 and on the upstream side in the horizontal direction from the imaginary line 24. In other words, it is sufficient that the opening 22 is provided so that the minimum distance $d_{min}$ (mm) between the returning pipe 11 and the imaginary line 24 satisfies the relation represented by the following formula (26) with the radius $D_{down}$ (mm) of the downfalling pipe 5'.

$$0 < d_{min} < D_{down} \tag{26}$$

In FIG. 13, an opening 22 is obliquely provided in the vicinity of a lower end of a side portion (side wall) of a downstream side pit 20 on the upstream side in the horizontal direction, but the opening satisfying the above conditions (1) and (2) may be provided in a bottom of the downstream side pit 20. For example, when the opening is provided in the vicinity of a left end in the bottom of the downstream side pit 20, the above conditions (1) and (2) are satisfied. In this case, the returning pipe extends downwardly from the opening in the Figure. Also by such a construction, it is possible to separate a boundary laminar flow flowing along a wall face of the downfalling pipe 5' on the upstream side in the horizontal direction of the pipe, that is on the left side of the pipe in the Figure, from a main flow. However, in such a construction, since it is necessary to bend the returning pipe in the middle to extend the returning pipe towards the upstream side in the horizontal direction, the flow resistance of molten glass in the returning pipe may increase. Further, in a case of a structure wherein an opening of the returning pipe is provided in a bottom of the downstream side pit, it is not possible to increase the area of the opening and the flow resistance of molten glass in the returning pipe 11 becomes high as compared with a structure wherein an opening 22 is obliquely provided in the vicinity of a lower end of a side portion (side wall) of the downstream side pit 20 on the upstream side in the horizontal direction of the pit as shown in FIG. 13.

Accordingly, as shown in FIG. 13, it is preferred to obliquely provide the opening 22 in the vicinity of a lower end of a side portion (side wall) of the downstream side pit 20 on the upstream side in the horizontal direction of the pit as shown in FIG. 13. Here, an angle α (degrees) between the opening 22 and the imaginary line 24 preferably satisfies the following formula (27).

$$10 \leq \alpha \leq 80 \tag{27}$$

Here, when the angle α satisfies the above formula (27), the construction is excellent in separation of a boundary laminar flow, and the area of the opening 22 is proper. Further, since the bending angle of the flow path of molten glass entering from the opening 22 into the returning pipe 11 becomes gentle, the flow resistance of molten glass in the returning pipe 11 does not increase. Further, from the viewpoint of separation of boundary laminar flow and the viewpoint of equipment, the angle α is more preferably at least 20 degrees and at most 70 degrees.

As shown in FIG. 13, when the opening 22 of the returning pipe 11 extending in the upstream side in the horizontal direction, is obliquely provided in the vicinity of a lower end of a side portion (side wall) of the downstream side pit 20 on the upstream side in the horizontal direction, in order to suppress slack of molten glass in the vicinity of the opening 22, it is preferred to make the height of the bottom face of the downstream side pit 20 different from the height of the bottom face of the returning pipe 11 so as to form a step between them. In FIG. 13, the height of the bottom face of the returning pipe 11 is lower than the height of the bottom face of the upstream side pit 20.

Figure 14:
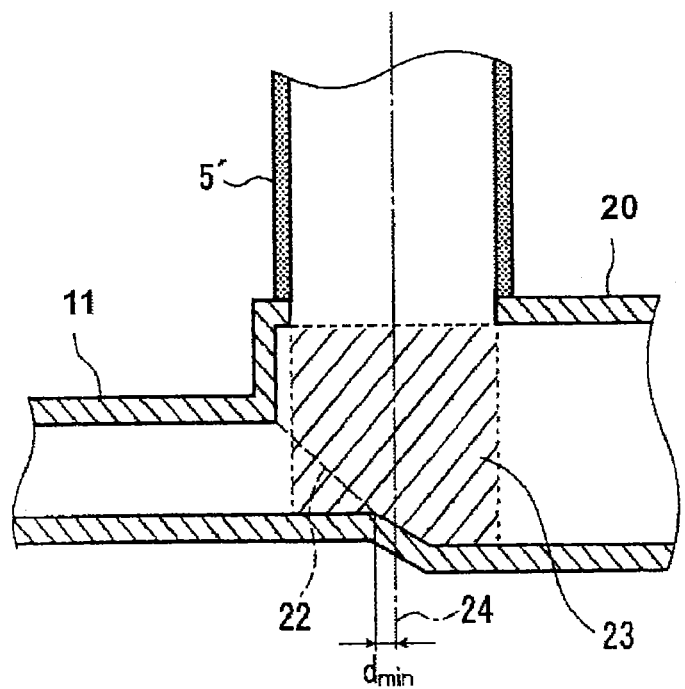
FIG. 14 is a partial enlarged view showing a downstream side pit and its vicinity of another example of the fourth embodiment of the vacuum degassing apparatus of the present invention.

FIG. 14 is a partial enlarged view showing a downstream side pit and its vicinity of another example of the fourth embodiment of the vacuum degassing apparatus of the present invention. In FIG. 14, the height of the bottom face of the downstream side pit 20 is lower than the height of the bottom face of the returning pipe 11 contrarily to that of FIG. 13.

As shown in FIGS. 13 and 14, in a case of providing a step between the bottom face of the upstream side pit 20 and the bottom face of the returning pipe 11 in order to suppress slack of molten glass in the vicinity of the opening 22, they are preferably connected by a slope structure having an angle of from 5 to 60°. Here, the phrase "a slope structure having an angle of from 5 to 60° as an approximate shape" mainly means a slope structure of a slope shape having an angle of from 5 to 60°, but it is not limited thereto, and it includes a step structure which can be approximated by a slope structure having an angle of from 5 to 60°. When the angle of the slope structure is within the above range, it is possible to effectively suppress slack of molten glass in the vicinity of the opening 22. Further, if the angle of the slope structure is too small, since the length of the slope structure becomes long, the cross-sectional area of the downstream side pit 20 or the returning pipe 11 becomes small, or the cross-sectional area of the downstream side pit 20 or the returning pipe 11 changes in the middle, such being not preferred.

The slope structure connecting the bottom face of the downstream side pit 20 and the bottom face of the returning pipe 11 preferably has an angle of from 10 to 60 degrees, more preferably from 30 to 60 degrees.

When a step is provided between the bottom face of the downstream side pit 20 and the bottom face of the returning pipe 11, so long as they can be connected by a slope structure having an angle of from 5 to 60°, the height of the step is not particularly limited. The height of the step is preferably determined so that the area of the opening 22 becomes substantially the same as the cross-sectional area of the returning pipe 11.

Next, the vacuum degassing method of the present invention will be described.

The vacuum degassing method of the present invention is a method for vacuum-degassing molten glass by making the molten glass passing through a vacuum degassing vessel inside of which is maintained in a vacuum state, which is characterized in that a part of molten glass flowing out from the vacuum degassing vessel is separated and the separated molten glass is returned again to the vacuum degassing vessel. In other words, in the vacuum degassing method of the present invention, when vacuum-degassing of molten glass is carried out by using the vacuum degassing apparatus, a part of molten glass flowing out from a vacuum degassing vessel, specifically a boundary laminar flow containing many bubbles, is separated from molten glass flowing out from the vacuum degassing vessel, and the separated boundary laminar flow is returned again to the vacuum degassing vessel, to carry out vacuum-degassing again.

Accordingly, the vacuum degassing method of the present invention can be suitably carried out by employing the first to fourth embodiments of the vacuum degassing apparatus of the present invention.

In the vacuum degassing method for molten glass of the present invention, the molten glass is preferably continuously supplied and discharged from the vacuum degassing vessel.

Here, the flow rate of molten glass is preferably from 1 to 1,000 ton/day from the viewpoint of productivity.

The ratio of molten glass separated and returned to a vacuum degassing vessel based on the molten glass flown out from the vacuum degassing vessel, depends on the ratio of boundary laminar flow contained in the molten glass flown out from the vacuum degassing vessel, and it is preferably at most 20% of the molten glass flown out from the vacuum degassing vessel in order to prevent lowering of yield of production of glass. The ratio of molten glass separated and returned to the vacuum degassing vessel based on the molten glass flown out from the vacuum degassing vessel, is more preferably from 0.1 to 10%, further preferably from 1 to 5%.

The ratio of molten glass separated and returned to the vacuum degassing vessel based on molten glass flown out from the vacuum degassing vessel, can be changed while the vacuum degassing is carried out. For example, at a start of vacuum degassing, since the amount of bubbles contained in molten glass is large, the ratio of molten glass separated and returned to the vacuum degassing vessel is set to be high, and later, when the state of vacuum degassing is stabilized and bubbles are reduced, the ratio of molten glass separated and returned to the vacuum degassing vessel may be lowered. The ratio of molten glass separated and returned to the vacuum degassing vessel can be adjusted by changing the flow rate of molten glass in the returning pipe 11 by a pumping means 12.

Further, the separated molten glass is preferably heated and stirred in the returning pipe 11 before it is returned to the vacuum degassing vessel.

In order to prevent formation of a temperature difference between molten glass supplied from a melting vessel and molten glass in the vacuum degassing vessel, the vacuum degassing vessel is preferably heated so that the inside temperature is from 1,100 to 1,500° C., particularly preferably from 1,150 to 1,450° C. When the temperature of molten glass returned to the vacuum degassing vessel becomes lower than the temperature of molten glass continuously supplied from the melting vessel, it is possible to raise the temperature of molten glass in the returning pipe 11 by a heating means.

When the vacuum degassing method is carried out, inside of the vacuum degassing vessel disposed in a vacuum housing is maintained to be in a predetermined vacuum state by evacuating air in the vacuum housing to the outside by e.g. a vacuum pump. Here, inside of the vacuum degassing vessel is preferably evacuated to 51 to 613 hPa (38 to 460 mmHg), more preferably, inside of the vacuum degassing vessel is evacuated to 80 to 338 hPa (60 to 253 mmHg).

A glass applicable to the vacuum degassing method of the present invention is not limited in the composition so long as the glass is produced by a heat-melting method. Accordingly, it may be a soda lime silica type glass such as a soda lime glass, or an alkali glass such as an alkali borosilicate glass.

INDUSTRIAL APPLICABILITY

The present invention is applicable to production of various types of glasses required to satisfy strict bubble quality.

The entire disclosure of Japanese Patent Application No. 2008-046247 filed on Feb. 27, 2008 including specification, claims, drawings and summary is incorporated herein by reference in its entirety.

What is claimed is:

1. A vacuum degassing method for molten glass, comprising:
    passing molten glass through a vacuum degassing vessel inside of which is maintained in a vacuum state;
    separating a boundary laminar flow of the molten glass flown out from the vacuum degassing vessel; and
    returning the separated boundary laminar flow of the molten glass to the vacuum degassing vessel.

2. The vacuum degassing method for molten glass according to claim 1, wherein an amount of the separated boundary laminar flow of the molten glass is at least 0.1% and at most 10% of an amount of the molten glass passing through the vacuum degassing vessel.

3. The vacuum degassing method for molten glass according to claim 1, wherein an amount of the separated boundary laminar flow of the molten glass is at least 1% and at most 5% of an amount of the molten glass passing through the vacuum degassing vessel.

4. The vacuum degassing method for molten glass according to claim 1, wherein the passing comprises changing a ratio of an amount of the separated boundary laminar flow of the molten glass to an amount of the molten glass passing through the vacuum degassing vessel while the molten glass is passed through the vacuum degassing vessel.

5. The vacuum degassing method for molten glass according to claim 1, further comprising heating the separated boundary laminar flow of the molten glass before the returning of the separated boundary laminar flow of the molten glass to the vacuum degassing vessel.

6. The vacuum degassing method for molten glass according to claim 1, further comprising stirring the separated boundary laminar flow of the molten glass before the returning of the separated boundary laminar flow of the molten glass to the vacuum degassing vessel.

7. A method of manufacturing a glass product, comprising:
melting a glass material in a melting furnace to obtain molten glass;
passing the molten glass through a vacuum degassing vessel inside of which is maintained in a vacuum state;
separating a boundary laminar flow of the molten glass flown out from the vacuum degassing vessel;
returning the separated boundary laminar flow of the molten glass to the vacuum degassing vessel; and
supplying a remaining flow of the molten glass flown out from the vacuum degassing vessel to a forming apparatus configured to shape the molten glass.

8. The method according to claim 7, wherein an amount of the separated boundary laminar flow of the molten glass is at least 0.1% and at most 10% of an amount of the molten glass passing through the vacuum degassing vessel.

9. The method according to claim 7, wherein an amount of the separated boundary laminar flow of the molten glass is at least 1% and at most 5% of an amount of the molten glass passing through the vacuum degassing vessel.

10. The method according to claim 7, wherein the passing comprises changing a ratio of an amount of the separated boundary laminar flow of the molten glass to an amount of the molten glass passing through the vacuum degassing vessel while the molten glass is passed through the vacuum degassing vessel.

11. The method according to claim 7, further comprising heating the separated boundary laminar flow of the molten glass before the returning of the separated boundary laminar flow of the molten glass to the vacuum degassing vessel.

12. The method according to claim 7, further comprising stirring the separated boundary laminar flow of the molten glass before the returning of the separated boundary laminar flow of the molten glass to the vacuum degassing vessel.

13. The method according to claim 7, wherein the molten glass flown out from the vacuum degassing vessel is passed through a downfalling pipe attached to the vacuum degassing vessel and through a conduit structure positioned on a downstream side of the downfalling pipe, the conduit structure has a double pipe structure comprising an inner pipe and an outer pipe, the outer pipe has a closed end and a side wall that has an opening, and
the separating comprises causing the boundary laminar flow of the molten glass to flow through the opening provided on the side wall of the outer pipe, and causing the remaining flow of the molten glass flown out from the vacuum degassing vessel to flow through the inner pipe.

14. The method according to claim 13, wherein the remaining flow is passed through an open end of the inner pipe such that the remaining flow flows in a downstream direction.

15. The method according to claim 13, further comprising forming a two-layer flow in an uprising pipe connected to the vacuum degassing vessel, the two-layer flow includes a lower flow and an upper flow, the lower flow comprises the boundary laminar flow flown through the opening provided on the side wall of the outer pipe, and the upper flow comprises newly supplied molten glass.

16. The method according to claim 7, wherein the molten glass flown out from the vacuum degassing vessel is passed through a downfalling pipe attached to the vacuum degassing vessel and received in a downstream side pit connected to the downfalling pipe, the separated boundary laminar flow of the molten glass is returned to the vacuum degassing vessel through a returning pipe connected to the downstream side pit at an opening, and the opening of the returning pipe satisfies (1) and (2), and separates the boundary laminar flow of the molten glass flown out from the vacuum degassing vessel:
(1) the opening crosses a part of an imaginary area obtained by imaginarily extending the downfalling pipe in a downstream direction; and
(2) the opening does not cross an imaginary line obtained by imaginarily extending a central axis of the downfalling pipe in the downstream direction.

17. The method according to claim 16, wherein a minimum distance $d_{min}$ between the returning pipe and the imaginary line, and a radius $D_{down}$ of the downfalling pipe, satisfy:

$$0 < d_{min} < D_{down}.$$

18. The method according to claim 16, wherein an angle a between the opening and the imaginary line satisfy:

$$10 \leq \alpha \leq 80.$$

19. The method according to claim 16, wherein a height of a bottom face of the downstream side pit is different from a height of a bottom face of the returning pipe in a vicinity of the opening.

20. The method according to claim 19, wherein the bottom face of the downstream side pit and the bottom face of the returning pipe, which have different heights from each other, are connected via a slope structure having an angle of from 5 to 60°.

21. The method according to claim 16, wherein an area of the opening approximately equals to a cross-sectional area of the returning pipe.

* * * * *